United States Patent [19]
Kröhnke et al.

[11] Patent Number: 5,883,165
[45] Date of Patent: Mar. 16, 1999

[54] STABILIZER COMBINATION FOR THE ROTOMOLDING PROCESS

[75] Inventors: Christoph Kröhnke, Kleingasse, Germany; Urs Leo Stadler, Madison, N.J.

[73] Assignee: Ciba Specialty Chemicals Corporation, Tarrytown, N.Y.

[21] Appl. No.: 958,679

[22] Filed: Oct. 27, 1997

[30] Foreign Application Priority Data

Oct. 30, 1996 [CH] Switzerland ............... 268096

[51] Int. Cl.$^6$ .............. C08K 5/15; C08K 5/49; C08K 5/53; C08K 5/52
[52] U.S. Cl. ............ 524/111; 524/117; 524/119; 524/123; 524/125; 529/128; 529/147; 529/149
[58] Field of Search ............... 524/111, 117, 524/119, 123, 125, 128, 147, 149

[56] References Cited

U.S. PATENT DOCUMENTS

| | | | |
|---|---|---|---|
| 4,325,863 | 4/1982 | Flinshen et al. | 524/111 |
| 4,338,244 | 7/1982 | Flinken et al. | 524/109 |
| 5,175,312 | 12/1992 | Dubs et al. | 524/309 |
| 5,216,052 | 6/1993 | Nesvadba et al. | 524/108 |
| 5,252,643 | 10/1993 | Nesvadba | 524/111 |
| 5,356,966 | 10/1994 | Nesvadba | 524/111 |
| 5,367,008 | 11/1994 | Nesvadba | 524/111 |
| 5,369,159 | 11/1994 | Nesvadba et al. | 524/111 |
| 5,428,162 | 6/1995 | Nesvadba et al. | 544/221 |
| 5,428,177 | 6/1995 | Nesvadba | 549/304 |
| 5,488,117 | 1/1996 | Nesvadba | 549/535 |
| 5,516,920 | 5/1996 | Nesvadba et al. | 549/307 |
| 5,614,572 | 3/1997 | Nesvadba et al. | 524/111 |

FOREIGN PATENT DOCUMENTS

| | | |
|---|---|---|
| 1230271 | 12/1987 | Canada . |
| 0415887 | 8/1980 | European Pat. Off. . |
| 0589839 | 9/1993 | European Pat. Off. . |
| 0597319 | 10/1993 | European Pat. Off. . |
| 0644190 | 9/1994 | European Pat. Off. . |
| 2252325 | 8/1992 | United Kingdom . |
| 2281910 | 3/1995 | United Kingdom . |
| 8001566 | 8/1980 | WIPO . |

OTHER PUBLICATIONS

Encyclopedia of Polymer Science and Engineering, Wilsy Interscience, 1988, vol. 14 pp. 659–678.

R. Gächter, F. Müller, Plastics Additives Handbook Hanser Publishers, pp. 40–71 (1990).

*Primary Examiner*—Kriellion S. Morgan
*Attorney, Agent, or Firm*—Luther A. R. Hall

[57] ABSTRACT

A description is given of a process for the production of polyolefin hollow articles, which comprises charging the polyolefin with a stabilizer combination, comprising (A) at least one compound from the group of the organic phosphites or phosphonites, and (B) at least one compound from the group of the 3-arylbenzofuranones, filling this mixture into a mold, heating this mold in an oven to above 280° C., such that the stabilised polyolefin fuses, rotating the mold around at least 2 axes, the plastic spreading to the walls, and cooling the mold while still rotating, opening it and taking the resultant hollow article out.

7 Claims, No Drawings

STABILIZER COMBINATION FOR THE ROTOMOLDING PROCESS

The present invention relates to the production of polyolefin hollow articles by the rotomolding process, the processing stabilizer combination described hereinbelow being used.

The rotomolding or rotational molding/casting process is used for the production of fairly large plastic hollow articles which may be reinforced with glass fibres (Encyclopedia of Polymer Science and Engineering, Wiley Interscience, 1988, Vol. 14, pages 659–670). In principle, this process is carried out as follows: The plastic material is filled into one half of the mold which is then closed with the other half and heated in an oven such that the fused plastic material spreads to the walls of the mold when rotated around different axes. The hollow article is obtained after cooling. In this manner it is possible to produce, for example, storage and truck tanks from HD polyethylene. The process normally requires temperatures in the range above 300° C., sometimes even above 400° C. The requirements placed on the stabilizers are therefore different from those, for example, of the extrusion process where the temperatures are normally not much above 280° C.

The use of stabilizer combinations of phosphites or phosphonites with sterically hindered phenols and/or sterically hindered amines (HALS) in polyolefins is known [see, inter alia, R. Gächter, H. Müller, "Plastics Additives Handbook", Hanser Publishers, pages 40–71 (1990)].

The use of compounds from the group of the 3-arylbenzofuranones as stabilizers for organic polymers is disclosed, inter alia, in U.S. Pat. No. 4,325,863; U.S. Pat. No. 4,388,244; U.S. Pat. No. 5,175,312; U.S. Pat. No. 5,252,643; U.S. Pat. No. 5,216,052; U.S. Pat. No. 5,369,159; U.S. Pat. No. 5,488,117; U.S. Pat. No. 5,356,966; U.S. Pat. No. 5,367,008; U.S. Pat. No. 5,428,162; U.S. Pat. No. 5,428,177 or U.S. Pat. No. 5,516,920.

It has now been found that a combination of organic phosphites or phosphonites arid 3-arylbenzofuranones, together with optional further additives, preferably phenolic antioxidants or sterically hindered amines (HALS), results in an excellent stabilization in the rotomolding process.

Accordingly, this invention relates to a process for the production of polyolefin hollow articles, which comprises charging the polyolefin with a stabilizer combination, comprising A) at least one compound from the group of the organic phosphites or phosphonites, and B) at least one compound from the group of the 3-arylbenzofuranones, filling this mixture into a mold, heating this mold in an oven to above 280° C., such that the stabilized polyolefin fuses, rotating the mold around at least 2 axes, the plastic material spreading to the walls, and cooling the mold while still rotating, opening it and taking the resultant hollow article out.

Of interest is a process comprising as component (A) at least one compound of the formulae 1, 2, 3, 4, 5, 6 or 7

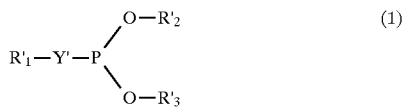

(1)

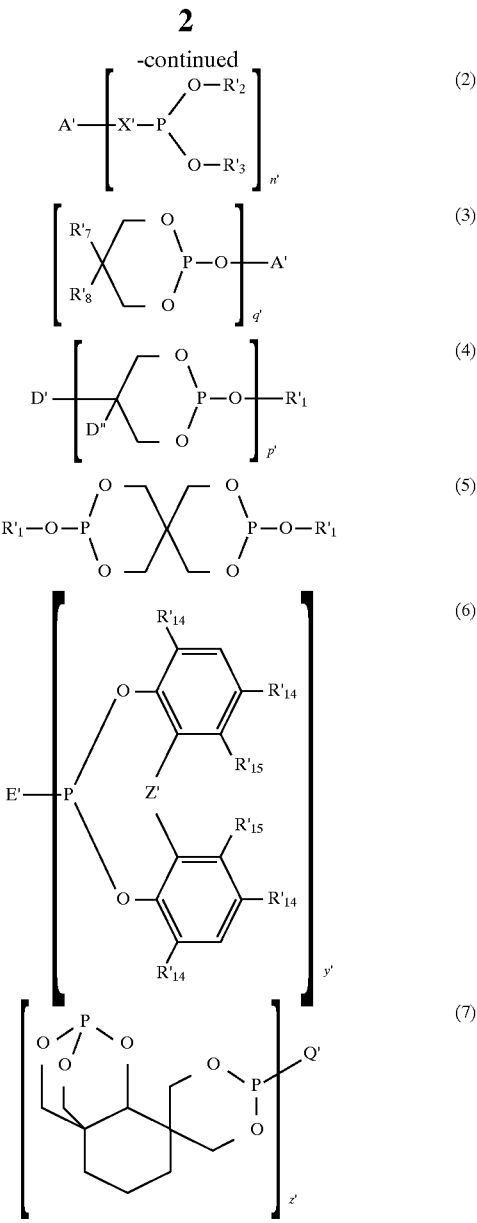

in which the indices are integral and n' is 2, 3 or 4; p' is 1 or 2; q' is 2 or 3; r' is 4 to 12; y' is 1, 2 or 3; and z' is 1 to 6;

A', if n' is 2, is $C_2$–$C_{18}$alkylene; $C_2$–$C_{12}$alkylene interrupted by oxygen, sulfur or —$NR'_4$—; a radical of the formula

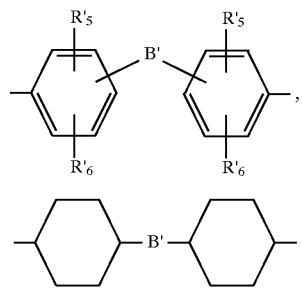

or phenylene;

A', if n' is 3, is a radical of the formula —$C_rH_{2r-1}$—;

A', if n' is 4, is

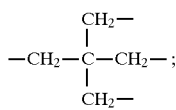

A" is as defined for A' if n' is 2;

B' is a direct bond, —$CH_2$—, —$CHR'_4$—, —$CR'_1R'_4$—, sulfur, $C_5$–$C_7$cycloalkylidene, or cyclohexylidene which is substituted by from 1 to 4 $C_1$–$C_4$alkyl radicals in position 3, 4 and/or 5;

D', if p' is 1, is $C_1$–$C_4$alkyl and, if p' is 2, is —$CH_2OCH_2$—;

D", if p' is 1, is $C_1$–$C_4$alkyl;

E', if y' is 1, is $C_1$–$C_8$alkyl, —$OR'_1$ or halogen;

E', if y is 2, is —O—A"—O—,

E', if y is 3, is a radical of the formula $R'_4C(CH_2O—)_3$ or $N(CH_2CH_2O—)_3$;

Q' is the radical of an at least z'-valent alcohol or phenol, this radical being attached via the oxygen atom to the phosphorus atom;

$R'_1$, $R'_2$ and $R'_3$ independently of one another are $C_1$–$C_{18}$alkyl which is unsubstituted or substituted by halogen, —$COOR'_4$, —CN or —$CONR'_4R'_4$; $C_2$–$C_{18}$alkyl interrupted by oxygen, sulfur or —$NR'_4$—; $C_7$–$C_9$phenylalkyl; $C_5$–$C_{12}$cycloalkyl, phenyl or naphthyl; naphthyl or phenyl substituted by halogen, 1 to 3 alkyl radicals or alkoxy radicals having a total of 1 to 18 carbon atoms or by $C_7$–$C_9$phenylalkyl; or a radical of the formula

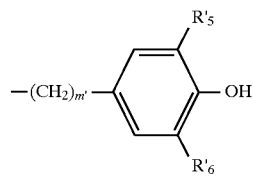

in which m' is an integer from the range 3 to 6;

$R'_4$ is hydrogen, $C_1$–$C_{18}$alkyl, $C_5$–$C_{12}$cycloalkyl or $C_7$–$C_9$phenylalkyl, $R'_5$ and $R'_6$ independently of one another are hydrogen, $C_1$–$C_8$alkyl or $C_5$–$C_6$cycloalkyl, $R'_7$ and $R'_8$, if q' is 2, independently of one another are $C_1$–$C_4$alkyl or together are a 2,3-dehydropentamethylene radical; and $R'_7$ and $R'_8$, if q' is 3, are methyl;

$R'_{14}$ is hydrogen, $C_1$–$C_9$alkyl or cyclohexyl, $R'_{15}$ is hydrogen or methyl and, if two or more radicals $R'_{14}$ and $R'_{15}$ are present, these radicals are identical or different, X' and Y' are each a direct bond or oxygen, Z' is a direct bond, methylene, —$C(R'_{16})_2$— or sulfur, and $R'_{16}$ is $C_1$–$C_8$alkyl.

Of particular interest is a process comprising as component (A) a phosphite or phosphonite of the formula 1, 2, 5 or 6, in which n' is the number 2 and y' is the number 1, 2 or 3;

A' is $C_2$–$C_{18}$alkylene, p-phenylene or p-biphenylene,

E', if y' is 1, is $C_1$–$C_{18}$alkyl, —$OR'_1$ or fluorine;

E', if y' is 2, is p-biphenylene,

E', if y' is 3, is $N(CH_2CH_2O—)_3$, $R'^1$, $R'_2$ and $R'_3$ independently of one another are $C_1$–$C_{18}$alkyl, $C_7$–$C_9$phenylalkyl, cyclohexyl, phenyl, or phenyl substituted by 1 to 3 alkyl radicals having a total of 1 to 18 carbon atoms;

$R'_{14}$ is hydrogen or $C_1$–$C_9$alkyl, $R'_{15}$ is hydrogen or methyl;

X' is a direct bond,

Y' is oxygen,

Z' is a direct bond or —$CH(R'_{16})$—, and $R'_{16}$ is $C_1$–$C_4$alkyl.

Likewise of interest is a process comprising as component (A) a phosphite or phosphonite of the formula 1, 2, 5 or 6, in which n' is the number 2 and y' is the number 1 or 3;

A' is p-biphenylene,

E', if y' is 1, is $C_1$–$C_{18}$alkoxy or fluorine,

E', if y' is 3, is $N(CH_2CH_2O—)_3$,

R', $R'_2$ and $R'_3$ independently of one another are $C_1$–$C_{18}$alkyl, or phenyl substituted by 2 or 3 alkyl radicals having a total of 2 to 12 carbon atoms;

$R'_{14}$ is methyl or tert-butyl;

$R'_{15}$ is hydrogen;

X' is a direct bond;

Y' is oxygen; and

Z' is a direct bond, methylene or —$CH(CH_3)$—.

Particular preference is given to a process comprising as component (A) a phosphite or phosphonite of the formula 1, 2 or 6.

Special preference is given to a process comprising as component (A) at least one compound of the formula VII

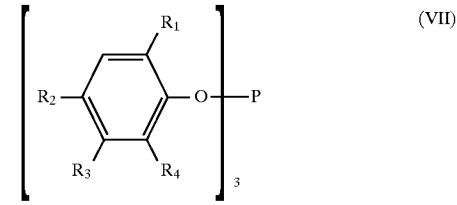

in which $R_1$ and $R_2$ independently of one another are hydrogen, $C_1$–$C_8$alkyl, cyclohexyl or phenyl, and $R_3$ and $R_4$ independently of one another are hydrogen or $C_1$–$C_4$alkyl.

The following compounds are examples of organic phosphites and phosphonites which are particularly suitable as component (A) in the novel process.

Triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite (Irgafos® 168, Ciba-Geigy), diisodecyl pentaerythritol diphosphite, bis(2,4-di-tert-butylphenyl) pentaerythritol diphosphite (formula D), bis(2,6-di-tert-butyl-4-methylphenyl) pentaerythritol diphosphite (formula E), bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylene-diphosphonite (Irgafos®P-EPQ, Ciba-Geigy, formula H), 6-isooctyloxy-2,4,8,10-tetra-tert-butyl-12H-dibenzo[d,g]-1,3,2-dioxaphosphocin (formula C), 6-fluoro- 2,4,8,10-tetra-tert-butyl-12-methyl-dibenzo[d,g]-1,3,2-dioxaphosphocin (formula A), bis(2,4-di-tert-butyl-6-methylphenyl) methyl phosphite, bis(2,4-di-tert-butyl-6-methylphenyl) ethyl phosphite (formula G).
With particular preference the following phosphites and phosphonites are used:
tris(2,4-di-tert-butylphenyl) phosphite (Irgafos®168, Ciba-Geigy), tris(nonylphenyl) phosphite,
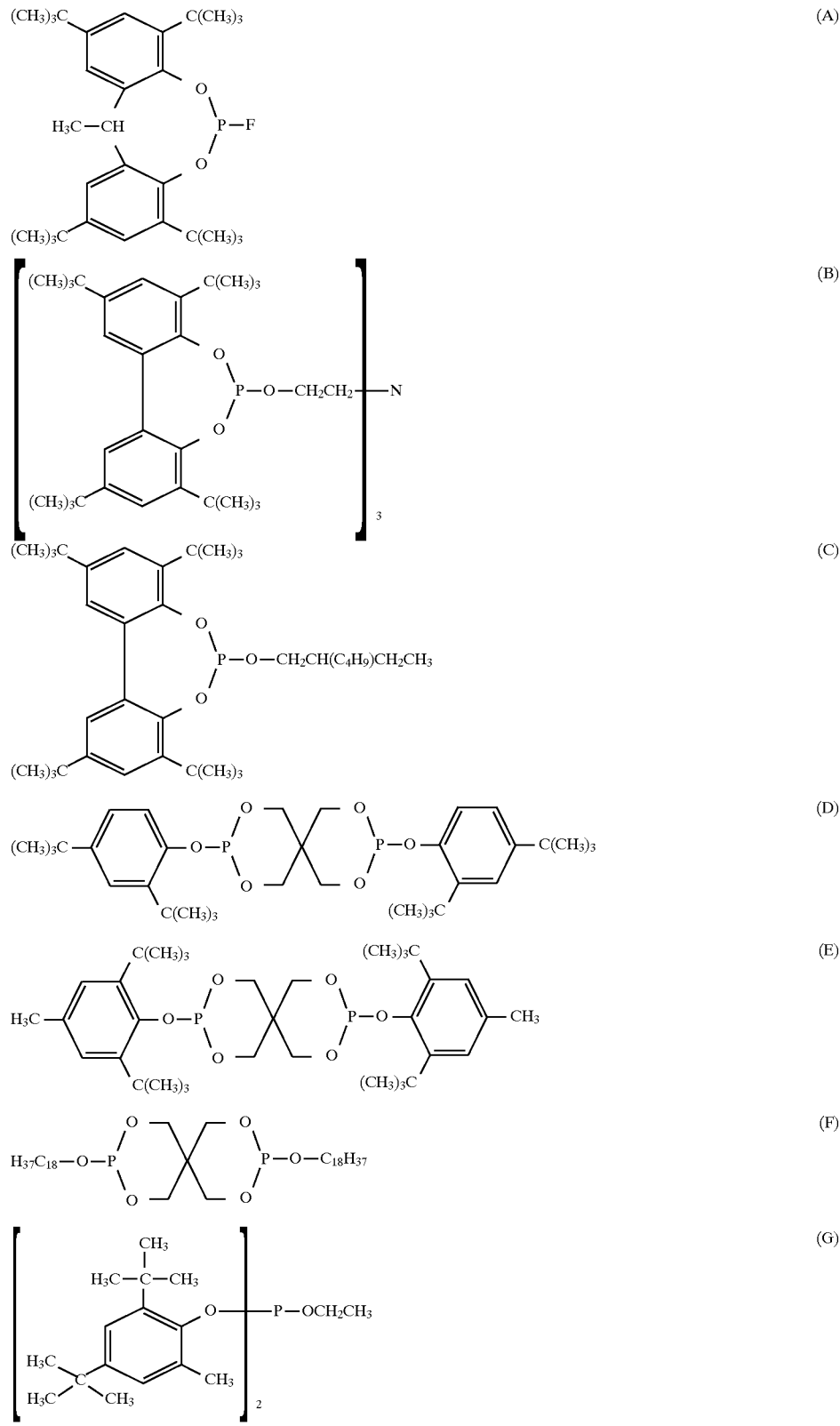

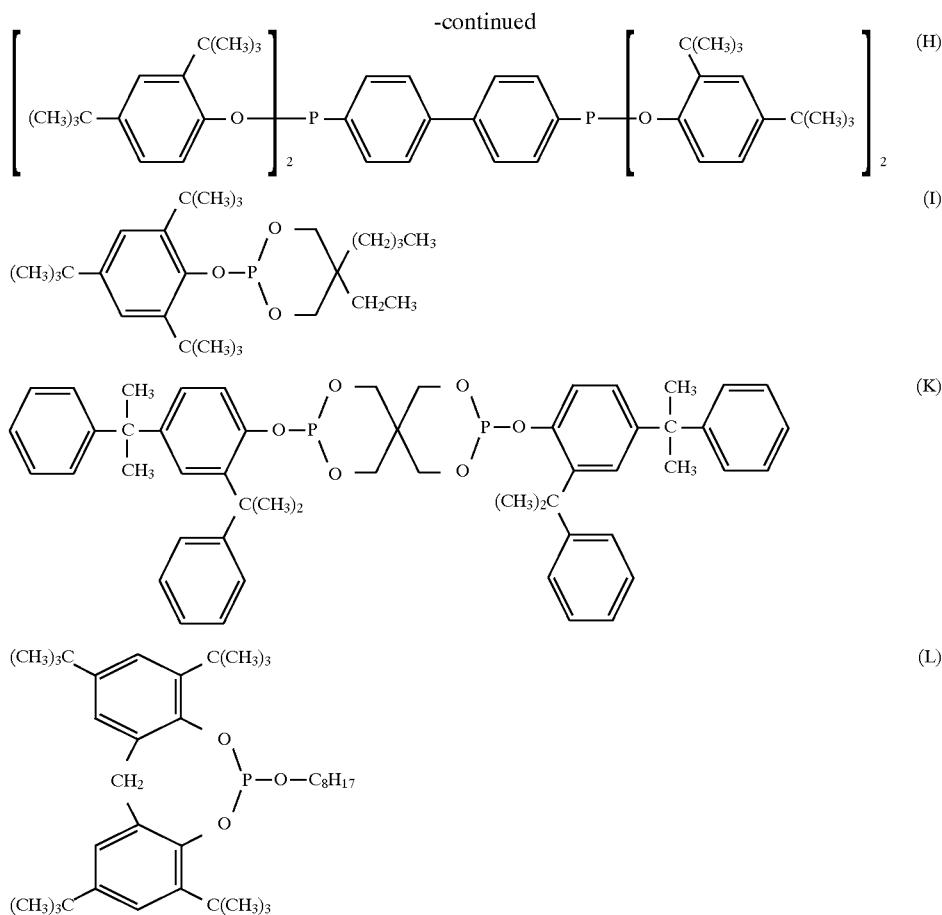

Very particular preference is given to tris(2,4-di-tert-butylphenyl) phosphite [Irgafos®168, Ciba Spezialitatenchemie AG], bis(2,4-di-tert-butyl-6-methylphenyl) ethyl phosphite [Irgafos®38, Ciba Spezialitatenchemie AG, formula (G)], Ultranox®626 [GE Chemicals, formula (D)], tetrakis(2,4-di-tert-butylphenyl) 4,4'-biphenylene-diphosphonite [Irgafos®P-EPQ, Ciba Spezialitätenchemie AG, formula (H)], Ultranox®641 [GE Chemicals, formula (1)], Doverphos®S9228 [Dover Chemicals, formula (K)] or Mark®HP10 [Adeka Argus, formula (L)].

These organic phosphites and phosphonites are known compounds; many of them are commercially available.

The organic phosphites or phosphonites are preferably used in amounts of, for example, 0.01 to 10%, in particular of 0.05 to 5%, typically of 0.1 to 3%, based on the weight of the polyolefin hollow article to be stabilized.

Of interest is a process comprising as component (B) a compound of the formula I

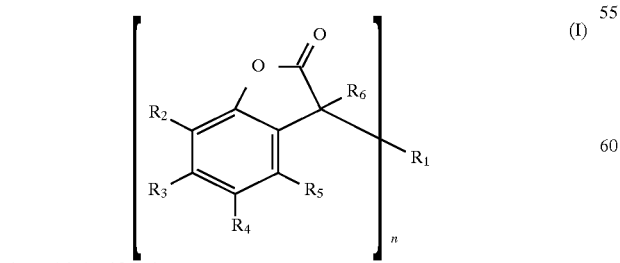

in which, if n is 1, $R_1$ is unsubstituted or $C_1$–$C_4$alkyl-, $C_1$–$C_4$alkoxy-, $C_1$–$C_4$alkylthio-, hydroxyl-, halo-, amino-, $C_1$–$C_4$alkylamino-, phenylamino- or di($C_1$–$C_4$alkyl)amino-substituted naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl, or $R_1$ is a radical of the formula II

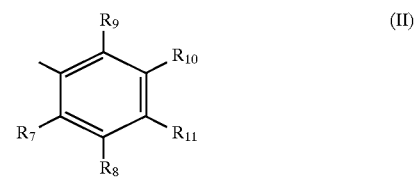

and
if n is 2,
  $R_1$ is unsubstituted or $C_1$–$C_4$alkyl- or hydroxy-substituted phenylene or naphthylene; or is —$R_{12}$—X—$R_{13}$—,
  $R_2$, $R_3$, $R_4$ and $R_5$ independently of one another are hydrogen, chlorine, hydroxyl, $C_1$–$C_{25}$alkyl, $C_7$–$C_9$phenylalkyl, unsubstituted or $C_1$–$C_4$alkyl-substituted phenyl; unsubstituted or $C_1$–$C_4$alkylsubstituted $C_5$–$C_8$cycloalkyl; $C_1$–$C_{18}$alkoxy, $C_1$–$C_4$alkylthio, $C_1$–$C_4$alkylamino, di($C_1$–$C_4$alkyl)amino, $C_1$–$C_{25}$alkanoyloxy, $C_1$–$C_{25}$alkanoylamino, $C_3$–$C_{25}$alkenoyloxy, $C_3$–$C_{25}$alkanoyloxy which is interrupted by oxygen, sulfur or

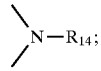

$C_6$–$C_9$cycloalkyl-carbonyloxy, benzoyloxy or $C_1$–$C_{12}$alkyl-substituted benzoyloxy; or else the radicals $R_2$ and $R_3$ or the radicals $R_3$ and $R_4$ or the radicals $R_4$ and $R_5$, together with the carbon atoms to which they are attached, form a benzo ring, $R_4$ is additionally —$(CH_2)_p$—$COR_{15}$ or —$(CH_2)_q$OH or, if $R_3$, $R_5$ and $R_6$ are hydrogen, $R_4$ is additionally a radical of the formula III

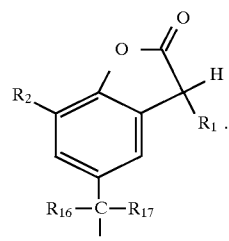

in which $R_1$ is defined as indicated above for n=1, $R_6$ is hydrogen or a radical of the formula IV

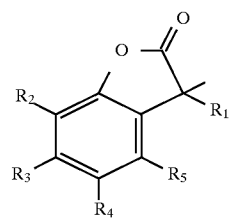

where $R_4$ is not a radical of the formula III and $R_1$ is defined as indicated above for n=1, $R_7$, $R_8$, $R_9$, $R_{10}$ and $R_{11}$ independently of one another are hydrogen, halogen, hydroxyl, $C_1$–$C_{25}$alkyl, $C_2$–$C_{25}$alkyl interrupted by oxygen, sulfur or

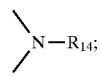

$C_1$–$C_{25}$alkoxy,
$C_2$–$C_{25}$alkoxy interrupted by oxygen, sulfur or

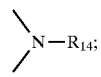

$C_1$–$C_{25}$alkylthio, $C_3$–$C_{25}$alkenyl, $C_3$–$C_{25}$alkenyloxy, $C_3$–$C_{25}$alkynyl, $C_3$–$C_{25}$alkynyloxy, $C_7$–$C_9$phenylalkyl, $C_7$–$C_9$phenylalkoxy, unsubstituted or $C_1$–$C_4$alkyl-substituted phenyl; unsubstituted or $C_1$–$C_4$alkyl-substituted phenoxy; unsubstituted or $C_1$–$C_4$alkyl-substituted $C_5$–$C_8$cycloalkyl; unsubstituted or $C_1$–$C_4$alkyl-substituted $C_5$–$C_8$cycloalkoxy; $C_1$–$C_4$alkylamino, di($C_1$–$C_4$alkyl)amino, $C_1$–$C_{25}$alkanoyl, $C_3$–$C_{25}$alkanoyl interrupted by oxygen, sulfur or

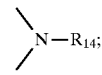

$C_1$–$C_{25}$alkanoyloxy, $C_3$–$C_{25}$alkanoyloxy interrupted by oxygen, sulfur or

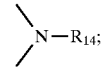

$C_1$–$C_{25}$alkanoylamino, $C_3$–$C_{25}$alkenoyl, $C_3$–$C_{25}$alkenoyl interrupted by oxygen, sulfur or

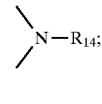

$C_3$–$C_{25}$alkenoyloxy, $C_3$–$C_{25}$alkenoyloxy interrupted by oxygen, sulfur or

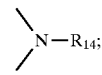

$C_6$–$C_9$cycloalkylcarbonyl, $C_6$–$C_9$cycloalkylcarbonyloxy, benzoyl or $C_1$–$C_{12}$alkyl-substituted benzoyl; benzoyloxy or $C_1$–$C_{12}$alkyl-substituted benzoyloxy;

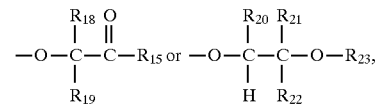

or else, in formula II, the radicals $R_7$ and $R_8$ or the radicals $R_8$ and $R_{11}$, together with the carbon atoms to which they are attached, form a benzo ring, $R_{12}$ and $R_{13}$ independently of one another are unsubstituted or $C_1$–$C_4$alkyl-substituted phenylene or naphthylene, $R_{14}$ is hydrogen or $C_1$–$C_8$alkyl, $R_{15}$ is hydroxyl,

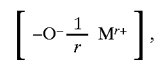

$C_1$–$C_{18}$alkoxy or

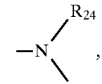

$R_{16}$ and $R_{17}$ independently of one another are hydrogen, $CF_3$, $C_1$–$C_{12}$alkyl or phenyl, or $R_{16}$ and $R_{17}$, together with the C atom to which they are attached, form a $C_5$–$C_8$cycloalkylidene ring which is unsubstituted or substituted from 1 to 3 times by $C_1$–$C_4$alkyl;

$R_{18}$ and $R_{19}$ independently of one another are hydrogen, $C_1$–$C_4$alkyl or phenyl, $R_{20}$ is hydrogen or $C_1$–$C_4$alkyl, $R_{21}$ is hydrogen, unsubstituted or $C_1$–$C_4$alkyl-substituted phenyl; $C_1$–$C_{25}$alkyl, $C_2$–$C_{25}$alkyl interrupted by oxygen, sulfur or

$C_7$–$C_9$phenylalkyl which is unsubstituted or substituted on the phenyl radical from 1 to 3 times by $C_1$–$C_4$alkyl; $C_7$–$C_{25}$phenylalkyl which is unsubstituted or substituted on the phenyl radical from 1 to 3 times by $C_1$–$C_4$alkyl and interrupted by oxygen, sulfur or

or else the radicals $R_{20}$ and $R_{21}$, together with the carbon atoms to which they are attached, form a $C_5$–$C_{12}$cycloalkylene ring which is unsubstituted or substituted from 1 to 3 times by $C_1$–$C_4$alkyl;

$R_{22}$ is hydrogen or $C_1$–$C_4$alkyl, $R_{23}$ is hydrogen, $C_1$–$C_{25}$alkanoyl, $C_3$–$C_{25}$alkenoyl, $C_3$–$C_{25}$alkanoyl interrupted by oxygen, sulfur or

$C_2$–$C_{25}$alkanoyl substituted by a di($C_1$–$C_6$alkyl) phosphonate group;

$C_6$–$C_9$cycloalkylcarbonyl, thenoyl, furoyl, benzoyl or $C_1$–$C_{12}$alkyl-substituted benzoyl;

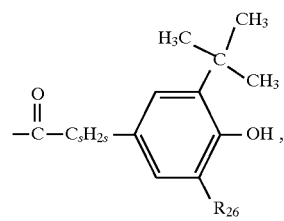

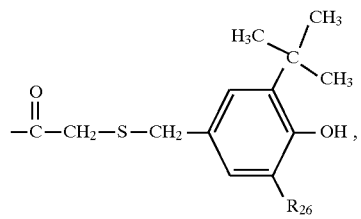

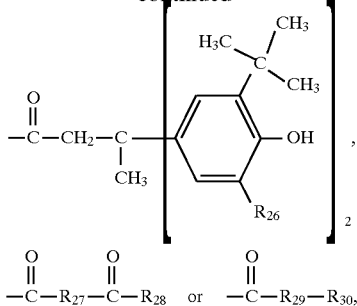

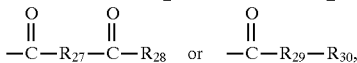

$R_{24}$ and $R_{25}$ independently of one another are hydrogen or $C_1$–$C_{18}$alkyl, $R_{26}$ is hydrogen or $C_1$–$C_8$alkyl, $R_{27}$ is a direct bond, $C_1$–$C_{18}$alkylene, $C_2$–$C_{18}$alkylene interrupted by oxygen, sulfur or

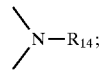

$C_2$–$C_{18}$alkenylene, $C_2$–$C_{20}$alkylidene, $C_7$–$C_{20}$phenylalkylidene, $C_5$–$C_8$cycloalkylene, $C_7$–$C_8$bicycloalkylene, unsubstituted or $C_1$–$C_4$alkyl-substituted phenylene, or

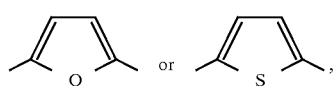

$R_{28}$ is hydroxyl,

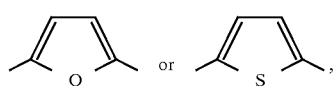

$C_1$–$C_{18}$alkoxy or

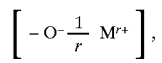

$R_{29}$ is oxygen, —NH— or

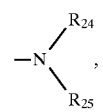

$R_{30}$ is $C_1$–$C_{18}$alkyl or phenyl, $R_{31}$ is hydrogen or $C_1$–$C_{18}$alkyl, M is an r-valent metal cation, X is a direct bond, oxygen, sulfur or —$NR_{31}$—, n is 1 or 2, p is 0, 1 or 2, q is 1, 2, 3, 4, 5 or 6, r is 1, 2 or 3, and s is 0, 1 or 2.

Unsubstituted or $C_1$–$C_4$alkyl-, $C_1$–$C_4$alkoxy-, $C_1$–$C_4$alkylthio-, hydroxyl-, halo-, amino-, $C_1$–$C_4$alkylamino-, phenylamino- or di($C_1$–$C_4$alkyl)amino-substituted naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl is, for example, 1-naphthyl, 2-naphthyl, 1-phenylamino-4-naphthyl, 1-methylnaphthyl, 2-methylnaphthyl, 1-methoxy-2-naphthyl, 2-methoxy-1-naphthyl, 1-dimethylamino-2-naphthyl, 1,2-dimethyl-4-naphthyl, 1,2-dimethyl-6-naphthyl, 1,2-dimethyl-7-naphthyl, 1,3-dimethyl-6-naphthyl, 1,4-dimethyl-6-naphthyl, 1,5-dimethyl-2-naphthyl, 1,6-dimethyl-2-naphthyl, 1-hydroxy-2-naphthyl, 2-hydroxy-1-naphthyl, 1,4-dihydroxy-2-naphthyl, 7-phenanthryl, 1-anthryl, 2-anthryl, 9-anthryl, 3-benzo[b]thienyl, 5-benzo[b]thienyl, 2-benzo[b]thienyl, 4-dibenzofuryl, 4,7-dibenzofuryl, 4-methyl-7-dibenzofuryl, 2-xanthenyl, 8-methyl-2-xanthenyl, 3-xanthenyl, 2-phenoxathiinyl, 2,7-phenoxathiinyl, 2-pyrrolyl, 3-pyrrolyl, 5-methyl-3-pyrrolyl, 2-imidazolyl, 4-imidazolyl, 5-imidazolyl, 2-methyl-4-imidazolyl, 2-ethyl-4-imidazolyl, 2-ethyl-5-imidazolyl, 3-pyrazolyl, 1-methyl-3-pyrazolyl, 1-propyl-4-pyrazolyl, 2-pyrazinyl, 5,6-dimethyl-2-pyrazinyl, 2-indolizinyl, 2-methyl-3-isoindolyl, 2-methyl-1-isoindolyl, 1-methyl-2-indolyl, 1-methyl-3-indolyl, 1,5-dimethyl-2-indolyl, 1-methyl-3-indazolyl, 2,7-dimethyl-8-purinyl, 2-methoxy-7-methyl-8-purinyl, 2-quinolizinyl, 3-isoquinolyl, 6-isoquinolyl, 7-isoquinolyl, isoquinolyl, 3-methoxy-6-isoquinolyl, 2-quinolyl, 6-quinolyl, 7-quinolyl, 2-methoxy-3-quinolyl, 2-methoxy-6-quinolyl, 6-phthalazinyl, 7-phthalazinyl, 1-methoxy-6-phthalazinyl, 1,4-dimethoxy-6-phthalazinyl, 1,8-naphthyridin-2-yl, 2-quinoxalinyl, 6-quinoxalinyl, 2,3-dimethyl-6-quinoxalinyl, 2,3-di-methoxy-6-quinoxalinyl, 2-quinazolinyl, 7-quinazolinyl, 2-dimethylamino-6-quinazolinyl, 3-cinnolinyl, 6-cinnolinyl, 7-cinnolinyl, 3-methoxy-7-cinnolinyl, 2-pteridinyl, 6-pteridinyl, 7-pteridinyl, 6,7-dimethoxy-2-pteridinyl, 2-carbazolyl, 3-carbazolyl, 9-methyl-2-carbazolyl, 9-methyl-3-carbazolyl, β-carbolin-3-yl, 1-methyl-β-carbolin-3-yl, 1-methyl-β-carbolin-6-yl, 3-phenanthridinyl, 2-acridinyl, 3-acridinyl, 2-perimidinyl, 1-methyl-5-perimidinyl, 5-phenanthrolinyl, 6-phenanthrolinyl, 1-phenazinyl, 2-phenazinyl, 3-isothiazolyl, 4-isothiazolyl, 5-isothiazolyl, 2-phenothiazinyl, 3-phenothiazinyl, 10-methyl-3-phenothiazinyl, 3-isoxazolyl, 4-isoxazolyl, 5-isoxazolyl, 4-methyl-3-furazanyl, 2-phenoxazinyl or 10-methyl-2-phenoxazinyl.

Particular preference is given to unsubstituted or $C_1$–$C_4$alkyl-, $C_1$–$C_4$alkoxy-, $C_1$–$C_4$alkylthio-, hydroxyl-, phenylamino- or di($C_1$–$C_4$alkyl)amino-substituted naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, isoindolyl, indolyl, phenothiazinyl, biphenyl, terphenyl, fluorenyl or phenoxazinyl such as, for example, 1-naphthyl, 2-naphthyl, 1-phenylamino-4-naphthyl, 1-methylnaphthyl, 2-methyl naphthyl, 1-methoxy-2-naphthyl, 2-methoxy-1-naphthyl, 1-dimethylamino-2-naphthyl, 1,2-dimethyl-4-naphthyl, 1,2- dimethyl-6-naphthyl, 1,2-dimethyl-7-naphthyl, 1,3-dimethyl-6-naphthyl, 1,4-dimethyl-6-naphthyl, 1,5-dimethyl-2-naphthyl, 1,6-dimethyl-2-naphthyl, 1-hydroxy-2-naphthyl, 2-hydroxy-1-naphthyl, 1,4-dihydroxy-2-naphthyl, 7-phenanthryl, 1-anthryl, 2-anthryl, 9-anthryl, 3-benzo[b]thienyl, 5-benzo[b]thienyl, 2-benzo[b]thienyl, 4-dibenzofuryl, 4,7-dibenzofuryl, 4-methyl-7-dibenzofuryl, 2-xanthenyl, 8-methyl-2-xanthenyl, 3-xanthenyl, 2-pyrrolyl, 3-pyrrolyl, 2-phenothiazinyl, 3-phenothiazinyl, 10-methyl-3-phenothiazinyl.

Halogen (halo) is, for example, chlorine, bromine or iodine. Preference is given to chlorine.

Alkanoyl having up to 25 carbon atoms is a branched or unbranched radical such as, for example, formyl, acetyl, propionyl, butanoyl, pentanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, eicosanoyl or docosanoyl. Preference is given to alkanoyl having 2 to 18, especially 2 to 12, for example 2 to 6 carbon atoms. Particular preference is given to acetyl.

$C_2$–$C_{25}$alkanoyl substituted by a di($C_1$–$C_6$alkyl) phosphonate group is, for example, $(CH_3CH_2O)_2POCH_2CO—$, $(CH_3O)_2POCH_2CO—$, $(CH_3CH_2CH_2O)_2POCH_2CO—$, $(CH_3CH_2O)_2POCH_2CH_2CO—$, $(CH_3O)_2POCH_2CH_2CO—$, $(CH_3CH_2CH_2CH_2O)_2POCH_2CH_2CO—$, $(CH_3CH_2O)_2PO(CH_2)_4CO—$, $(CH_3CH_2O)_2PO(CH_2)_8CO—$ or $(CH_3CH_2O)_2PO(CH_2)_{17}CO—$.

Alkanoyloxy having up to 25 carbon atoms is a branched or unbranched radical such as, for example, formyloxy, acetoxy, propionyloxy, butanoyloxy, pentanoyloxy, hexanoyloxy, heptanoyloxy, octanoyloxy, nonanoyloxy, decanoyloxy, undecanoyloxy, dodecanoyloxy, tridecanoyloxy, tetradecanoyloxy, pentadecanoyloxy, hexadecanoyloxy, heptadecanoyloxy, octadecanoyloxy, eicosanoyloxy or docosanoyloxy. Preference is given to alkanoyloxy having 2 to 18, especially 2 to 12, for example 2 to 6 carbon atoms. Particular preference is given to acetoxy.

Alkenoyl having 3 to 25 carbon atoms is a branched or unbranched radical such as, for example, propenoyl, 2-butenoyl, 3-butenoyl, isobutenoyl, n-2,4-pentadienoyl, 3-methyl-2-butenoyl, n-2-octenoyl, n-2-dodecenoyl, iso-dodecenoyl, oleoyl, n-2-octadecenoyl or n-4-octadecenoyl. Preference is given to alkenoyl having 3 to 18, especially 3 to 12, for example 3 to 6, in particular 3 to 4 carbon atoms.

$C_3$–$C_{25}$alkenoyl interrupted by oxygen, sulfur or

is, for example, $CH_3OCH_2CH_2CH=CHCO—$ or $CH_3OCH_2CH_2OCH=CHCO—$.

Alkenoyloxy having 3 to 25 carbon atoms is a branched or unbranched radical such as, for example, propenoyloxy, 2-butenoyloxy, 3-butenoyloxy, isobutenoyloxy, n-2,4-pentadienoyloxy, 3-methyl-2-butenoyloxy, n-2-octenoyloxy, n-2-dodecenoyloxy, iso-dodecenoyloxy, oleoyloxy, n-2-octadecenoyloxy or n-4-octadecenoyloxy. Preference is given to alkenoyloxy having 3 to 18, especially 3 to 12, for example 3 to 6, in particular 3 to 4 carbon atoms.

$C_3$–$C_{25}$alkenoyloxy interrupted by oxygen, sulfur or

is, for example, $CH_3OCH_2CH_2CH=CHCOO$— or $CH_3OCH_2CH_2OCH=CHCOO$—.

$C_3$–$C_{25}$alkanoyl interrupted by oxygen, sulfur or

is, for example, $CH_3$—O—$CH_2CO$—, $CH_3$—S—$CH_2CO$—, $CH_3$—NH—$CH_2CO$—, $CH_3$—N($CH_3$)—$CH_2CO$—, $CH_3$—O—$CH_2CH_2$—O—$CH_2CO$—, $CH_3$—(O—$CH_2CH_2$—)$_2$O—$CH_2CO$—, $CH_3$—(O—$CH_2CH_2$—)$_3$O—$CH_2CO$— or $CH_3$—(O—$CH_2CH_2$—)$_4$O—$CH_2CO$—.

$C_3$–$C_{25}$alkanoyloxy interrupted by oxygen, sulfur or

is, for example, $CH_3$—O—$CH_2COO$—, $CH_3$—S—$CH_2COO$—, $CH_3$—NH—$CH_2COO$—, $CH_3$—N($CH_3$)—$CH_2COO$—, $CH_3$—O—$CH_2CH_2$—O—$CH_2COO$—, $CH_3$—(O—$CH_2CH_2$—)$_2$O—$CH_2COO$—, $CH_3$—(O—$CH_2CH_2$—)$_3$O—$CH_2COO$— or $CH_3$—(O—$CH_2CH_2$—)$_4$O—$CH_2COO$—.

$C_6$–$C_9$cycloalkylcarbonyl is, for example, cyclopentylcarbonyl, cyclohexylcarbonyl, cycloheptylcarbonyl or cyclooctylcarbonyl. Cyclohexylcarbonyl is preferred.

$C_6$–$C_9$cycloalkylcarbonyloxy is, for example, cyclopentylcarbonyloxy, cyclohexylcarbonyloxy, cycloheptylcarbonyloxy or cyclooctylcarbonyloxy. Cyclohexylcarbonyloxy is preferred.

$C_1$–$C_{12}$alkyl-substituted benzoyl, which preferably carries 1 to 3, especially 1 or 2 alkyl groups, is, for example, o-, m- or p-methylbenzoyl, 2,3-dimethylbenzoyl, 2,4-dimethylbenzoyl, 2,5-dimethylbenzoyl, 2,6-dimethylbenzoyl, 3,4-dimethylbenzoyl, 3,5-dimethylbenzoyl, 2-methyl-6-ethylbenzoyl, 4-tert-butylbenzoyl, 2-ethylbenzoyl, 2,4,6-trimethylbenzoyl, 2,6-dimethyl-4-tert-butylbenzoyl or 3,5-di-tert-butylbenzoyl. Preferred substituents are $C_1$–$C_8$alkyl, especially $C_1$–$C_4$alkyl.

$C_1$–$C_{12}$alkyl-substituted benzoyloxy, which preferably carries 1 to 3, especially 1 or 2 alkyl groups, is, for example, o-, m- or p-methylbenzoyloxy, 2,3-dimethylbenzoyloxy, 2,4-dimethylbenzoyloxy, 2,5-dimethylbenzoyloxy, 2,6-dimethylbenzoyloxy, 3,4-dimethylbenzoyloxy, 3,5-dimethylbenzoyloxy, 2-methyl-6-ethylbenzoyloxy, 4-tert-butylbenzoyloxy, 2-ethyl-benzoyloxy, 2,4,6-trimethylbenzoyloxy, 2,6-dimethyl-4-tert-butylbenzoyloxy or 3,5-di-tert-butylbenzoyloxy. Preferred substituents are $C_1$–$C_8$alkyl, especially $C_1$–$C_4$alkyl.

Alkyl having up to 25 carbon atoms is a branched or unbranched radical such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred meanings of $R_2$ and $R_4$ is, for example, $C_1$–$C_{18}$alkyl. A particularly preferred meaning of $R_4$ is $C_1$–$C_4$alkyl.

Alkenyl having 3 to 25 carbon atoms is a branched or unbranched radical such as, for example, propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl. Preference is given to alkenyl having 3 to 18, especially 3 to 12, for example 3 to 6, in particular 3 to 4 carbon atoms.

Alkenyloxy having 3 to 25 carbon atoms is a branched or unbranched radical such as, for example, propenyloxy, 2-butenyloxy, 3-butenyloxy, isobutenyloxy, n-2,4-pentadienyloxy, 3-methyl-2-butenyloxy, n-2-octenyloxy, n-2-dodecenyloxy, iso-dodecenyloxy, oleyloxy, n-2-octadecenyloxy or n-4-octadecenyloxy. Preference is given to alkenyloxy having 3 to 18, especially 3 to 12, for example 3 to 6, in particular 3 to 4 carbon atoms.

Alkynyl having 3 to 25 carbon atoms is a branched or unbranched radical such as, for example, propynyl (—$CH_2$—C≡CH), 2-butynyl, 3-butynyl, n-2-octynyl, or n-2-dodecynyl.

Preference is given to alkynyl having 3 to 18, especially 3 to 12, for example 3 to 6, in particular 3 to 4 carbon atoms.

Alkynyloxy having 3 to 25 carbon atoms is a branched or unbranched radical such as, for example, propynyloxy (—$OCH_2$—C≡CH), 2-butynyloxy, 3-butynyloxy, n-2-octynyloxy, or n-2-dodecynyloxy. Preference is given to alkynyloxy having 3 to 18, especially 3 to 12, for example 3 to 6, in particular 3 to 4 carbon atoms.

$C_2$–$C_{25}$alkyl interrupted by oxygen, sulfur or

is, for example, $CH_3$—f—$CH_2$—, $CH_3$—S—$CH_2$—, $CH_3$—NH—$CH_2$—, $CH_3$—N($CH_3$)—$CH_2$—, $CH_3$—O—$CH_2CH_2$—O—$CH_2$—, $CH_3$—(O—$CH_2CH_2$—)$_2$—$CH_2$—, $CH_3$—(O—$CH_2CH_2$—)$_3$—$CH_2$— or $CH_3$—(O—$CH_2CH_2$—)$_4$O—$CH_2$—.

$C_7$–$C_9$phenylalkyl is, for example, benzyl, α-methylbenzyl, α,α-dimethylbenzyl or 2-phenylethyl. Benzyl and α,α-dimethylbenzyl are preferred.

$C_7$–$C_9$phenylalkyl which is unsubstituted or substituted on the phenyl radical from 1 to 3 times by $C_1$–$C_4$alkyl is, for example, benzyl, α-methylbenzyl, α,α-dimethylbenzyl, 2-phenylethyl, 2-methylbenzyl, 3-methylbenzyl, 4-methylbenzyl, 2,4-dimethylbenzyl, 2,6-dimethylbenzyl or 4-tert-butylbenzyl. Benzyl is preferred.

$C_7$–$C_2$sphenylalkyl which is unsubstituted or substituted on the phenyl radical from 1 to 3 times by $C_1$–$C_4$alkyl and is interrupted by oxygen, sulfur or

is a branched or unbranched radical such as, for example, phenoxymethyl, 2-methylphenoxymethyl, 3-methylphenoxymethyl, 4-methylphenoxymethyl, 2,4-dimethylphenoxymethyl, 2,3-dimethylphenoxymethyl, phenylthiomethyl, N-methyl-N-phenylmethyl, N-ethyl-N-phenylmethyl, 4-tert-butylphenoxymethyl, 4-tert-butylphenoxyethoxymethyl, 2,4-di-tert-butylphenoxymethyl, 2,4-di-tertbutylphenoxyethoxymethyl, phenoxyethoxyethoxyethoxymethyl, benzyloxymethyl, benzyloxyethoxymethyl, N-benzyl-N-ethylmethyl or N-benzyl-N-isopropylmethyl.

$C_7$–$C_9$phenylalkoxy is, for example, benzyloxy, α-methylbenzyloxy, α,α-dimethylbenzyloxy or 2-phenylethoxy. Benzyloxy is preferred.

$C_1$–$C_4$alkyl-substituted phenyl, which preferably contains 1 to 3, especially 1 or 2 alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_1$–$C_4$alkyl-substituted phenoxy, which preferably contains 1 to 3, especially 1 or 2 alkyl groups, is, for example, o-, m- or p-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2-methyl-6-ethylphenoxy, 4-tert-butylphenoxy, 2-ethylphenoxy or 2,6-diethylphenoxy.

Unsubstituted or $C_1$–$C_4$alkyl-substituted $C_5$–$C_8$cycloalkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl. Preference is given to cyclohexyl and tert-butylcyclohexyl.

Unsubstituted or $C_1$–$C_4$alkyl-substituted $C_5$–$C_8$cycloalkoxy is, for example, cyclopentoxy, methylcyclopentoxy, dimethylcyclopentoxy, cyclohexoxy, methylcyclohexoxy, dimethylcyclohexoxy, trimethylcyclohexoxy, tert-butylcyclohexoxy, cycloheptoxy or cyclooctoxy. Preference is given to cyclohexoxy and tert-butylcyclohexoxy.

Alkoxy having up to 25 carbon atoms is a branched or unbranched radical such as, for example, methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. Preference is given to alkoxy having 1 to 12, especially 1 to 8, for example 1 to 6 carbon atoms.

$C_2$–$C_{25}$alkoxy interrupted by oxygen, sulfur or

is, for example, $CH_3$—O—$CH_2CH_2$O—, $CH_3$—S—$CH_2CH_2$O—, $CH_3$—NH—$CH_2CH_2$O—, $CH_3$—N($CH_3$)—$CH_2CH_2$O—, $CH_3$—O—$CH_2CH_2$—O—$CH_2CH_2$O—, $CH_3$—(O—$CH_2CH_2$—)$_2$O—$CH_2CH_2$O—, $CH_3$—(O—$CH_2CH_2$—)$_3$O—$CH_2CH_2$O— or $CH_3$—(O—$CH_2CH_2$—)$_4$O—$CH_2CH_2$O—.

Alkylthio having up to 25 carbon atoms is a branched or unbranched radical such as, for example, methylthio, ethylthio, propylthio, isopropylthio, n-butylthio, isobutylthio, pentylthio, isopentylthio, hexylthio, heptylthio, octylthio, decylthio, tetradecylthio, hexadecylthio or octadecylthio. Preference is given to alkylthio having 1 to 12, especially 1 to 8, for example 1 to 6 carbon atoms.

Alkylamino having up to 4 carbon atoms is a branched or unbranched radical such as, for example, methylamino, ethylamino, propylamino, isopropylamino, n-butylamino, isobutylamino or tert-butylamino.

Di($C_1$–$C_4$alkyl)amino also means that the two radicals independently of one another are branched or unbranched, such as, for example, dimethylamino, methylethylamino, diethylamino, methyl-n-propylamino, methylisopropylamino, methyl-n-butylamino, methylisobutylamino, ethylisopropylamino, ethyl-n-butylamino, ethylisobutylamino, ethyl-tert-butylamino, diethylamino, diisopropylamino, isopropyl-n-butylamino, isopropylisobutylamino, di-n-butylamino or diisobutylamino.

Alkanoylamino having up to 25 carbon atoms is a branched or unbranched radical such as, for example, formylamino, acetylamino, propionylamino, butanoylamino, pentanoylamino, hexanoylamino, heptanoylamino, octanoylamino, nonanoylamino, decanoylamino, undecanoylamino, dodecanoylamino, tridecanoylamino, tetradecanoylamino, pentadecanoylamino, hexadecanoylamino, heptadecanoylamino, octadecanoylamino, eicosanoylamino or docosanoylamino. Preference is given to alkanoylamino having 2 to 18, especially 2 to 12, for example 2 to 6 carbon atoms.

$C_1$–$C_{18}$alkylene is a branched or unbranched radical such as, for example, methylene, ethylene, propylene, trimethylene, tetramethylene, pentamethylene, hexamethylene, heptamethylene, octamethylene, decamethylene, dodecamethylene or octadecamethylene. Preference is given to $C_1$–$C_{12}$alkylene, especially $C_1$–$C_8$alkylene.

A $C_1$–$C_4$alkyl-substituted $C_5$–$C_{12}$cycloalkylene ring, which preferably contains 1 to 3, especially 1 or 2 branched or unbranched alkyl group radicals is, for example, cyclopentylene, methylcyclopentylene, dimethylcyclopentylene, cyclohexylene, methylcyclohexylene, dimethylcyclohexylene, trimethylcyclohexylene, tert-butylcyclohexylene, cycloheptylene, cyclooctylene or cyclodecylene. Preference is given to cyclohexylene and tert-butylcyclohexylene.

$C_2$–$C_{18}$alkylene interrupted by oxygen, sulfur or

is, for example, —$CH_2$—O—$CH_2$—, —$CH_2$—S—$CH_2$—, —$CH_2$—NH—$CH_2$—, —$CH_2$—N($CH_3$)—$CH_2$—, —$CH_2$—O—$CH_2CH_2$—O—$CH_2$—, —$CH_2$—(O—$CH_2CH_2$—)$_2$O—$CH_2$—, —$CH_2$—(O—$CH_2CH_2$—)$_3$O—$CH_2$—, —$CH_2$—(O—$CH_2CH_2$—)$_4$O—$CH_2$— or —$CH_2CH_2$—S—$CH_2CH_2$—.

$C_2$–$C_{18}$alkenylene is, for example, vinylene, methylvinylene, octenylethylene or dodecenylethylene. Preference is given to $C_2$–$C_8$alkenylene.

Alkylidene having 2 to 20 carbon atoms is, for example, ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene. Preference is given to $C_2$–$C_8$-alkylidene.

Phenylalkylidene having 7 to 20 carbon atoms is, for example, benzylidene, 2-phenylethylidene or 1-phenyl-2-hexylidene. Preference is given to $C_7$–$C_9$-phenylalkylidene.

$C_5$–$C_8$cycloalkylene is a saturated hydrocarbon group having two free valencies and at least one ring unit and is, for example, cyclopentylene, cyclohexylene, cycloheptylene or cyclooctylene. Preference is given to cyclohexylene.

$C_7$–$C_8$bicycloalkylene is, for example, bicycloheptylene or bicyclooctylene.

Unsubstituted or $C_1$–$C_4$alkyl-substituted phenylene or naphthylene is, for example, 1,2-, 1,3-, 1,4-phenylene, 1,2-, 1,3-, 1,4-, 1,6-, 1,7-, 2,6- or 2,7-naphthylene. 1,4-Phenylene is preferred.

A $C_1$–$C_4$alkyl-substituted $C_5$–$C_8$cycloalkylidene ring, which preferably contains 1 to 3, especially 1 or 2 branched or unbranched alkyl group radicals is, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cycloheptylidene or cyclooctylidene. Preference is given to cyclohexylidene and tert-butylcyclohexylidene.

A mono-, di- or trivalent metal cation is preferably an alkali metal, alkaline earth metal or aluminium cation, for example, $Na^+$, $K^+$, $Mg^{++}$, $Ca^{++}$ or $Al^{+++}$.

These definitions apply to component (A) as well as to component (B).

An interesting process is that wherein component (B) is at least one compound of formula I, wherein, if n=1, $R_1$ is phenyl which is unsubstituted or substituted in para-position by $C_1$–$C_{18}$alkylthio or di($C_1$–$C_4$alkyl)amino; mono- to penta-substituted alkyphenyl containing together a total of at most 18 carbon atoms in the 1 to 5 alkyl substituents; naphthyl, biphenyl, terphenyl, phenanthryl, anthryl, fluorenyl, carbazolyl, thienyl, pyrrolyl, phenothizinyl or 5,6,7,8-tetrahydronaphthyl, each of which is unsubstituted or substituted by $C_1$–$C_4$alkyl, $C_1$–$C_4$alkoxy, $C_1$–$C_4$alkylthio, hydroxy or amino.

Preference is given to a process comprising as component (B) at least one compound of the formula I in which, if n is 2, $R_1$ is —$R_{12}$—X—$R_{13}$—, $R_{12}$ and $R_{13}$ are phenylene, X is oxygen or —$NR_{31}$—, and $R_{31}$ is $C_1$–$C_4$alkyl.

Preference is also given to a process comprising as component (B) at least one compound of the formula I in which, if n is 1, $R_1$ is unsubstituted or $C_1$–$C_4$alkyl-, $C_1$–$C_4$alkoxy-, $C_1$–$C_4$alkylthio-, hydroxyl-, halo-, amino-, $C_1$–$C_4$alkylamino- or di($C_1$–$C_4$-alkyl)amino-substituted naphthyl, phenanthryl, thienyl, dibenzofuryl, carbazolyl, fluorenyl or a radical of the formula II

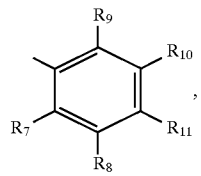

(II)

$R_7$, $R_8$, $R_9$, $R_{10}$ and $R_{11}$ independently of one another are hydrogen, chlorine, bromine, hydroxyl, $C_1$–$C_{18}$alkyl, $C_2$–$C_{18}$alkyl interrupted by oxygen or sulfur; $C_1$–$C_{18}$alkoxy, $C_2$–$C_{18}$alkoxy interrupted by oxygen or sulfur; $C_1$–$C_{18}$alkylthio, $C_3$–$C_{12}$alkenyloxy, $C_3$–$C_{12}$alkynyloxy, $C_7$–$C_9$phenylalkyl, $C_7$–$C_9$phenylalkoxy, unsubstituted or $C_1$–$C_4$alkyl-substituted phenyl; phenoxy, cyclohexyl, $C_5$–$C_8$cycloalkoxy, $C_1$–$C_4$alkylamino, di($C_1$–$C_4$-alkyl) amino, $C_1$–$C_{12}$alkanoyl, $C_3$–$C_{12}$alkanoyl interrupted by oxygen or sulfur; $C_1$–$C_{12}$alkanoyloxy, $C_3$–$C_{12}$alkanoyloxy interrupted by oxygen or sulfur; $C_1$–$C_{12}$alkanoylamino, $C_3$–$C_{12}$alkenoyl, $C_3$–$C_{12}$alkenoyloxy, cyclohexylcarbonyl, cyclohexylcarbonyloxy, benzoyl or $C_1$–$C_4$alkyl-substituted benzoyl; benzoyloxy or $C_1$–$C_4$alkyl-substituted benzoyloxy;

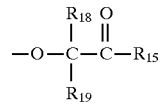

or

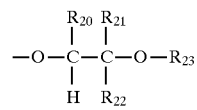

or else in formula II the radicals $R_7$ and $R_8$ or the radicals $R_8$ and $R_{11}$, together with the carbon atoms to which they are attached, form a benzo ring, $R_{15}$ is hydroxyl, $C_1$–$C_{12}$alkoxy or

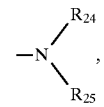

$R_{18}$ and $R_{19}$ independently of one another are hydrogen or $C_1$–$C_4$alkyl, $R_{20}$ is hydrogen, $R_{21}$ is hydrogen, phenyl, $C_1$–$C_{18}$alkyl, $C_2$–$C_{18}$alkyl interrupted by oxygen or sulfur;

$C_7$–$C_9$phenylalkyl, $C_7$–$C_{18}$-phenylalkyl which is unsubstituted or substituted on the phenyl radical from 1 to 3 times by $C_1$–$C_4$alkyl and is interrupted by oxygen or sulfur, or else the radicals $R_{20}$ and $R_{21}$, together with the carbon atoms to which they are attached, form a cyclohexylene ring which is unsubstituted or substituted from 1 to 3 times by $C_1$–$C_4$alkyl, $R_{22}$ is hydrogen or $C_1$–$C_4$alkyl, $R_{23}$ is hydrogen, $C_1$–$C_{18}$alkanoyl, $C_3$–$C_{18}$alkenoyl, $C_3$–$C_{12}$alkanoyl interrupted by oxygen or sulfur; $C_2$–$C_{12}$alkanoyl substituted by a di($C_1$–$C_6$-alkyl) phosphonate group; $C_6$–$C_9$cycloalkylcarbonyl, benzoyl,

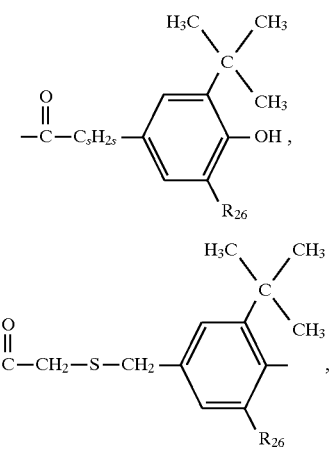

-continued

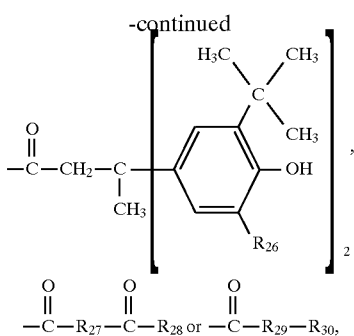

$R_{24}$ and $R_{25}$ independently of one another are hydrogen or $C_1$–$C_{12}$alkyl, $R_{26}$ is hydrogen or $C_1$–$C_4$alkyl, $R_{27}$ is $C_1$–$C_{12}$alkylene, $C_2$–$C_8$alkenylene, $C_2$–$C_8$alkylidene, $C_7$–$C_{12}$phenylalkylidene, $C_5$–$C_8$cycloalkylene or phenylene.

$R_{28}$ is hydroxyl, $C_1$–$C_{12}$alkoxy or

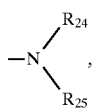

$R_{29}$ is oxygen or —NH—, $R_{30}$ is $C_1$–$C_{18}$alkyl or phenyl, and s is1 or2.

Preference is likewise given to a process comprising as component (B) at least one compound of the formula I in which, if n is 1, $R_1$ is phenanthryl, thienyl, dibenzofuryl, unsubstituted or $C_1$–$C_4$alkyl-substituted carbazolyl; or is fluorenyl; or $R_1$ is a radical of the formula II

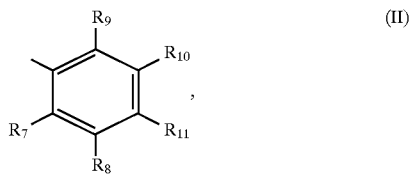

(II)

$R_7$, $R_8$, $R_9$, $R_{10}$ and $R_{11}$ independently of one another are hydrogen, chlorine, hydroxyl, $C_1$–$C_{18}$alkyl, $C_1$–$C_{18}$alkoxy, $C_1$–$C_{18}$alkylthio, $C_3$–$C_4$alkenyloxy, $C_3$–$C_4$alkinyloxy, $C_2$–$C_{18}$alkanoyloxy, phenyl, benzoyl, benzoyloxy or

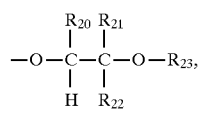

$R_{20}$ is hydrogen, $R_{21}$ is hydrogen, phenyl or $C_1$–$C_{18}$alkyl, or else the radicals $R_{20}$ and $R_{21}$, together with the carbon atoms to which they are attached, form a cyclohexylene ring which is unsubstituted or substituted from 1 to 3 times by $C_1$–$C_4$alkyl, $R_{22}$ is hydrogen or $C_1$–$C_4$alkyl, and $R_{23}$ is hydrogen, $C_1$–$C_{18}$alkanoyl or benzoyl.

Particular preference is given to a process comprising as component (B) at least one compound of the formula I in which, if n is 1, $R_7$, $R_8$, $R_9$, $R_{10}$ and $R_{11}$ independently of one another are hydrogen, $C_1$–$C_4$alkylthio or phenyl.

Of particular interest is a process comprising as component (B) at least one compound of the formula I in which $R_2$, $R_3$, $R_4$ and $R_5$ independently of one another are hydrogen, chlorine, $C_1$–$C_{18}$alkyl, benzyl, phenyl, $C_5$–$C_8$cycloalkyl, $C_1$–$C_{18}$alkoxy, $C_1$–$C_{18}$alkylthio, $C_1$–$C_{18}$alkanoyloxy, $C_1$–$C_{18}$alkanoylamino, $C_3$–$C_{18}$alkenoyloxy or benzoyloxy; or else the radicals $R_2$ and $R_3$ or the radicals $R_3$ and $R_4$ or the radicals $R_4$ and $R_5$, together with the carbon atoms to which they are attached, form a benzo ring, $R_4$ is additionally —$(CH_2)_p$—$COR_{15}$ or —$(CH_2)_q OH$, or, if $R_3$, $R_5$ and $R_6$ are hydrogen, $R_4$ is additionally a radical of the formula III, $R_{15}$ is hydroxyl, $C_1$–$C_{12}$alkoxy or

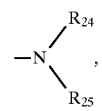

$R_{16}$ and $R_{17}$ are methyl groups or, together with the C atom to which they are attached, form a $C_5$–$C_8$cycloalkylidene ring which is unsubstituted or substituted from 1 to 3 times by $C_1$–$C_4$alkyl, $R_{24}$ and $R_{25}$ independently of one another are hydrogen or $C_1$–$C_{12}$alkyl, p is 1 or 2, and q is 2,3,4,5or6.

Also of particular interest is a process comprising as component (B) at least one compound of the formula I in which at least two of the radicals $R_2$, $R_3$, $R_4$ and $R_5$ are hydrogen.

Of special interest is a process comprising as component (B) at least one compound of the formula I in which $R_3$ and $R_5$ are hydrogen.

Of very special interest is a process comprising as component (B) at least one compound of the formula I in which $R_2$ is $C_1$–$C_4$alkyl, $R_3$ is hydrogen, $R_4$ is $C_1$–$C_4$alkyl or, if $R_6$ is hydrogen, $R_4$ is additionally a radical of the formula III, $R_5$ is hydrogen, and $R_{16}$ and $R_{17}$, together with the C atom to which they are attached, form a cyclohexylidene ring.

The following compounds are examples of the benzofuran-2-one type which are particularly suitable as component (B) in the novel process: 3-[4-(2-acetoxyethoxy) phenyl]-5,7-di-tert-butyl-benzofuran-2-one; 5,7-di-tert-butyl-3-[4-(2-stearoyloxyethoxy)phenyl]benzofuran-2-one; 3,3'-bis[5,7-di-tert-butyl-3-(4-[2-hydroxyethoxy]phenyl) benzofuran-2-one]; 5,7-di-tert-butyl-3-(4-ethoxyphenyl) benzofuran-2-one; 3-(4-acetoxy-3,5-dimethylphenyl)-5,7-di-tert-butylbenzofuran-2-one; 3-(3,5-dimethyl-4-pivaloyloxy-phenyl)-5,7-di-tert-butyl-benzofuran-2-one; 5,7-di-tert-butyl-3-phenylbenzofuran-2-one; 5,7-di-tert-butyl-3-(3,4-dimethylphenyl)-benzofuran-2-one; 5,7-di-tert-butyl-3-(2,3-dimethylphenyl)benzofuran-2-one.

Also of special interest is a process comprising as component (B) at least one compound of the formula V

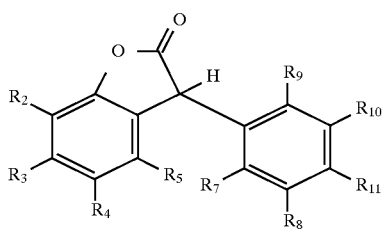

in which
R$_2$ is hydrogen or C$_1$–C$_6$alkyl,
R$_3$ is hydrogen,
R$_4$ is hydrogen or C$_1$–C$_6$alkyl,
R$_5$ is hydrogen,
R$_7$, R$_8$, R$_9$, R$_{10}$ and R$_{11}$ independently of one another are hydrogen, C$_1$–C$_4$alkyl or C$_1$–C$_4$alkoxy, with the proviso that at least two of the radicals R$_7$, R$_8$, R$_9$, R$_{10}$ or R$_{11}$ are hydrogen.

Very particular preference is given to a process comprising as component (B) at least one compound of the formula Va or Vb

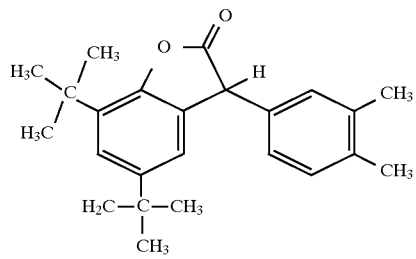

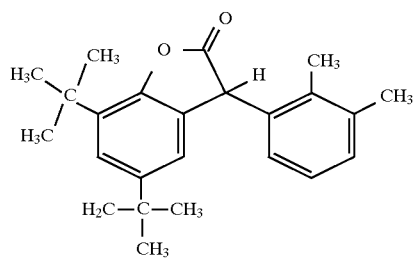

or a mixture of the two compounds of the formula Va and Vb.

The compounds of the benzofuran-2-one type as component (B) in the novel process are known in the literature and their preparation is described, for example, in the following U.S. patents: U.S. Pat. No. 4,325,863; U.S. Pat. No. 4,388,244; U.S. Pat. No. 5,175,312; U.S. Pat. No. 5,252,643; U.S. Pat. No. 5,216,052; U.S. Pat. No. 5,369,159; U.S. Pat. No. 5,488,117; U.S. Pat. No. 5,356,966; U.S. Pat. No. 5,367,008; U.S. Pat. No. 5,428,162; U.S. Pat. No. 5,428,177 or U.S. Pat. No. 5,516,920.

The 3-arylbenzofuranones are preferably used in amounts of, for example, 0.0005 to 5%, in particular of 0.001 to 2%, typically of 0.01 to 2%, based on the weight of the polyolefin hollow article to be stabilized.

The stabilizer combination comprising components (A) and (B) is suitable for stabilizing polyolefin hollow articles which are prepared by the rotomolding process.

Examples for polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(ll) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Preferred polyolefins are polyethylene or polypropylene and their copolymers with mono- and diolefins.

In addition to components (A) and (B) the novel process may comprise further costabilizers (additives) such as, for example, the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl4-hydroxyphenyl) adipate.

1.4. Tocopherols, for example α-tocopherol, βtocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)4-nonylphenol], 4,4'-methlenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O—, N— and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) proprionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9- nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-secbutyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tertoctylated N-phenyl-1-naphthylamine, a mixture of mono- and dialkylated tert-butyl/tertoctyidiphenylamines, a mixture of mono- and dialkylated nonyidiphenylamines, a mixture of mono- and dialkylated dodecyidiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl) phenyl]benzotriazole; 2-[2'-hydroxy-3'-(1,1,3,3-tetramethylbutyl)-5'-(α,α-dimethylbenzyl)phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyidithiocarbamate, nickel salts of the monoalkyl esters, e.g. the methyl or ethyl ester, of 4-hydroxy-3,5-di-tertbutylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1, 2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tertbutylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl) hexamethylenediamine, diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

5. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecylalpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

6. Thiosynergists, for example, dilauryl thiodipropionate or distearyl thiodipropionate.

7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyidithiocarbamate, dioctadecyl disulfide, pentaerythritol tetrakis(β-dodecylmercapto)propionate.

8. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

9. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

10. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

11. Other additives, for example, plasticisers, lubricants, emulsifiers, pigments, rheology additives, catalysts, flowcontrol agents, optical brighteners, flameproofing agents, antistatic agents and blowing agents.

The costabilizers are added, for example, in concentrations of from 0.01 to 10%, based on the overall weight of the polyolefin to be stabilized.

The fillers and reinforcing agents (item 10 in the list), for example talc, calcium carbonate, mica or kaolin, are added to the polyolefins in concentrations, for example, of from 0.01 to 40%, based on the overall weight of the polyolefins to be stabilized.

The fillers and reinforcing agents (item 10 in the list), for example metal hydroxides, especially aluminium hydroxide or magnesium hydroxide, are added to the polyolefins in concentrations, for example, of from 0.01 to 60%, based on the overall weight of the polyolefins to be stabilized.

Carbon black as filler is added to the polyolefins in concentrations, judiciously, of from 0.01 to 5%, based on the overall weight of the polyolefins to be stabilized.

Glass fibers as reinforcing agents are added to the polyolefins in concentrations, judiciously, of from 0.01 to 20%, based on the overall weight of the polyolefins to be stabilized.

Preferred is a process comprising in addition to components (A) and (B) further additives as well, especially phenolic antioxidants, light stabilizers or processing stabilizers.

Especially preferred additional additives are phenolic antioxidants (items 1.1 to 1.17 in the list), sterically hindered amines (item 2.6 in the list) and peroxide scavengers (item 7 in the list).

Particularly preferred phenolic antioxants are:

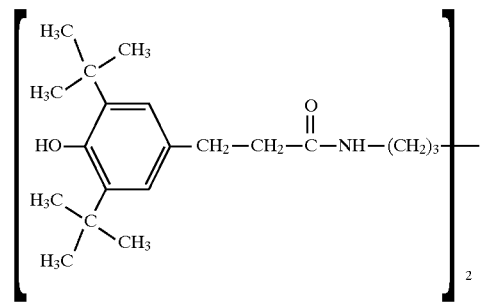

(AO-1) Irganox ® 1098

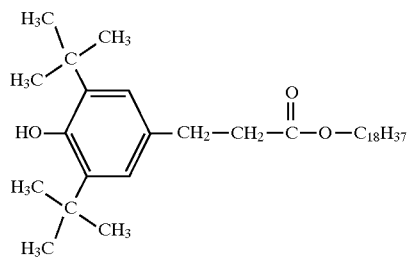

(AO-2) Irganox ® 1076

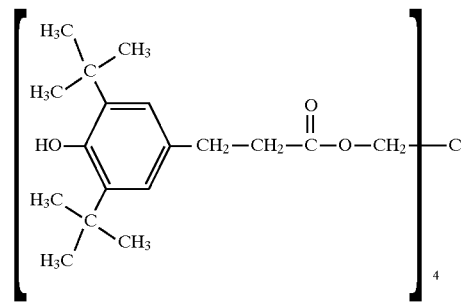

(AO-3) Irganox ® 1010

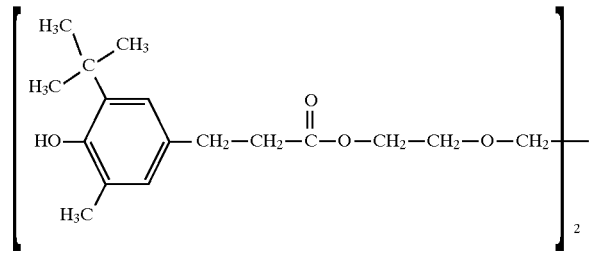

(AO-4) Irganox ® 245

-continued
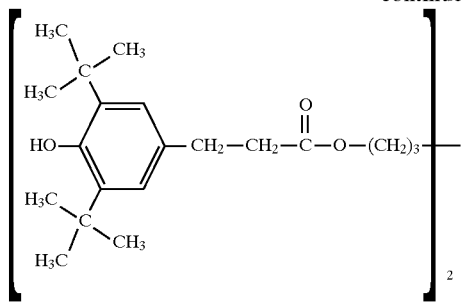
(AO-5) Irganox ® 259
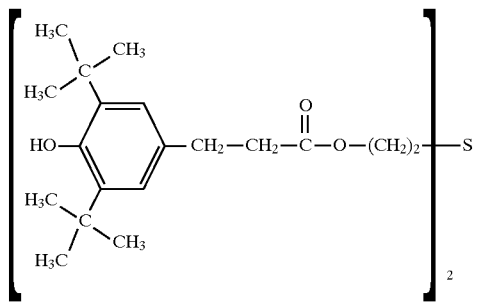
(AO-6) Irganox ® 1035
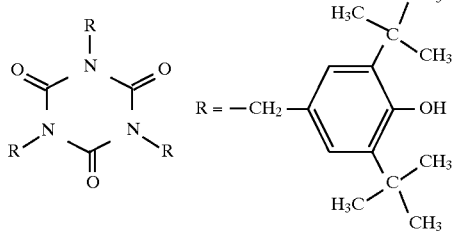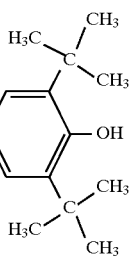
(AO-7) Irganox ® 3114
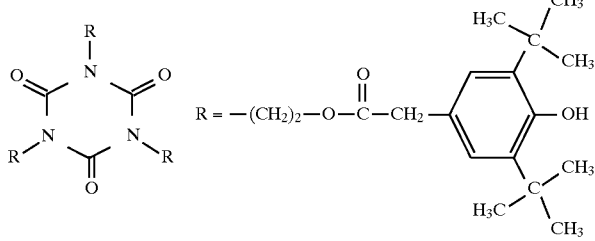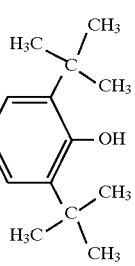
(AO-8) Irganox ® 3125
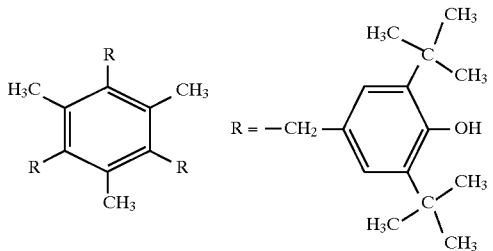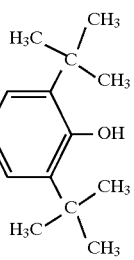
(AO-9) Irganox ® 1330
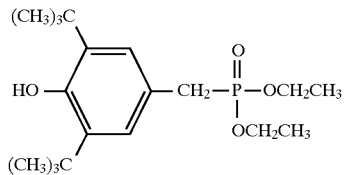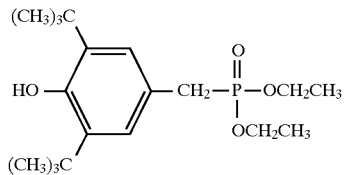
(AO-10) Irganox ® 1222

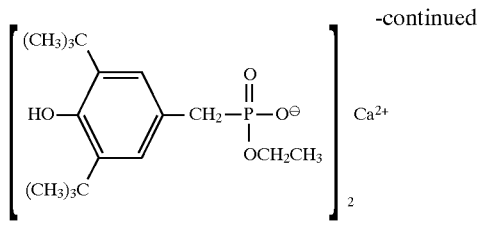
(AO-11) Irganox ® 1425
Irganox®1098, Irganox®1076, Irganox®1010, Irganox®245, Irganox®259, Irganox®1035, Irganox®3114, Irganox®3125, Irganox®1330, Irganox®1222 and Irganox®1425 are protected trade names of Ciba Spezialitätenchemie AG
Particularly preferred sterically hindered amines are:
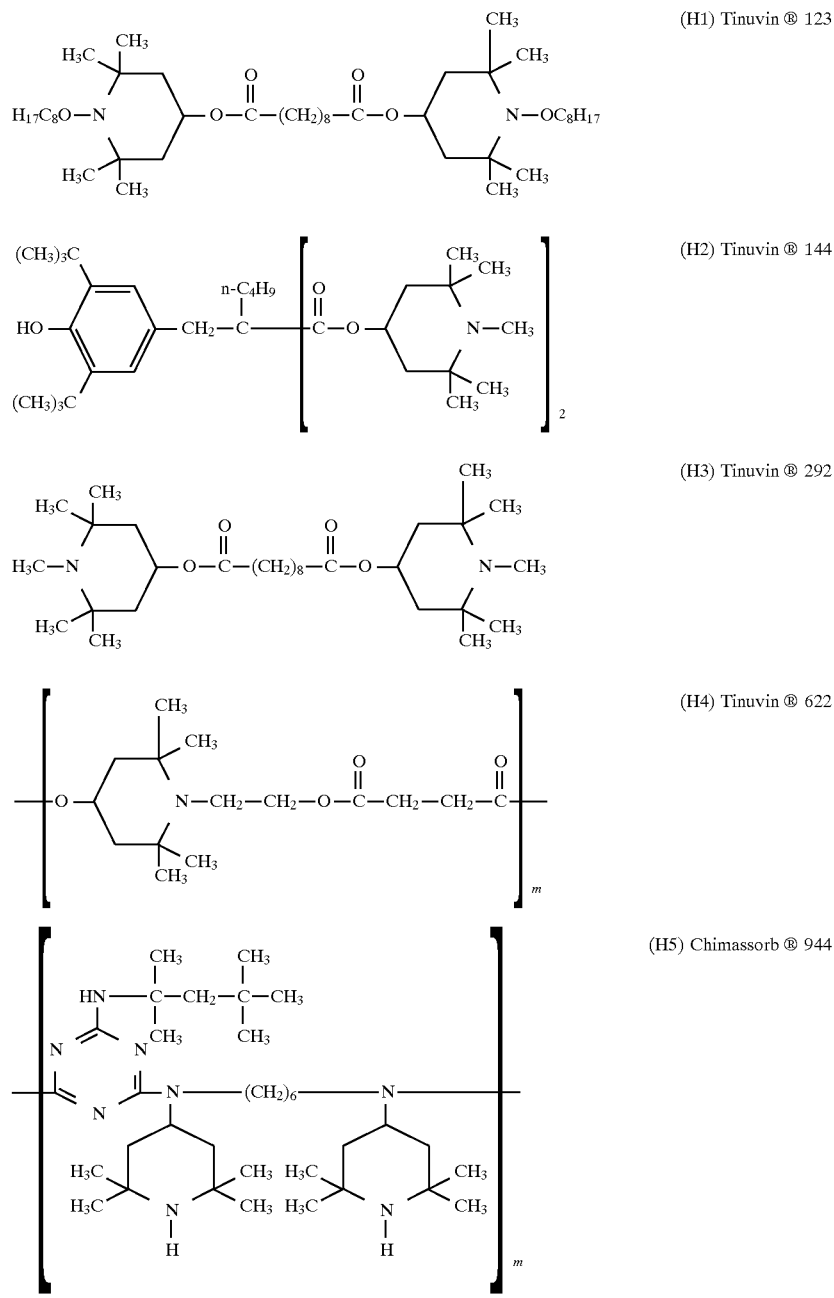

-continued

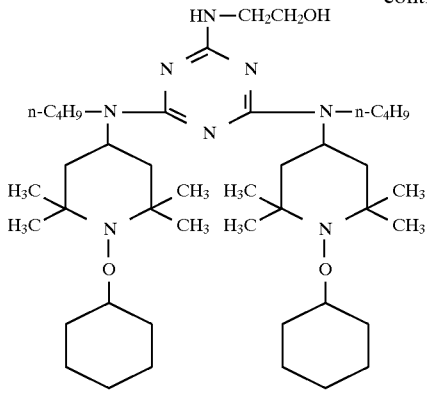
(H6)

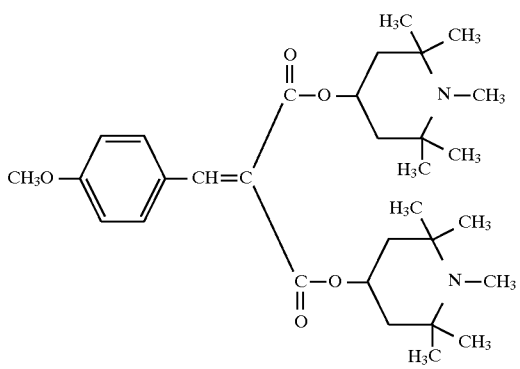

(H7) Sanduvor ® PR-31

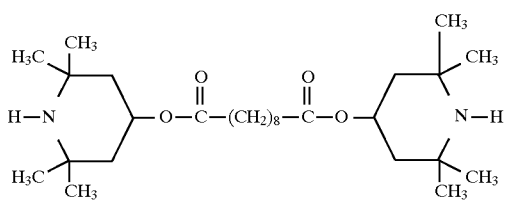
(H8) Tinuvin ® 770

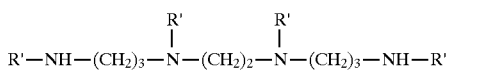
(H9) Chimassorb ® 119 wherein R' is

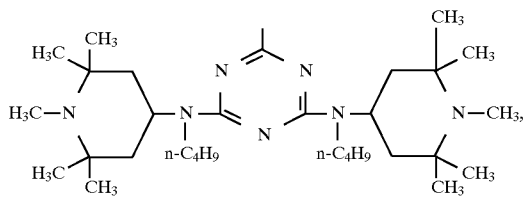

and m is a number from the range from 2 to 200.

The compounds of the sterically hindered amine type, are known and some are commercially available.

Tinuvin®123, Tinuvin®144, Tinuvin®292, Tinuvin®622, Tinuvin®770, Chimassorb®944 and Chimassorb®119 are protected trade names of Ciba Spezialitätenchemie AG. Sanduvore®PR-31 is a protected trade name of Clariant.

Particularly preferred stabilizer mixtures comprise, for example:
1. 56.7% of Irgafos® 168 (tris(2,4-di-tert-butylphenyl) phosphite),
15.0% of a mixture of about 85 parts by weight of the compound of formula V$a$ and about 15 parts by weight of the compound of formula V$b$; and
28.3% of Irganox® 1010 (compound of formula AO-3).
2. 42.5% of Irgafos® 168 (tris(2,4-di-tert-butylphenyl) phosphite),
15.0% of a mixture of about 85 parts by weight of the compound of formula V$a$ and about 15 parts by weight of the compound of formula V$b$; and
42.5% of Irganox® 1010 (compound of formula AO-3).
3. 56.7% of Irgafos® 168 (tris(2,4-di-tert-butylphenyl) phosphite),
15.0% of a mixture of about 85 parts by weight of the compound of formula V$a$ and about 15 parts by weight of the compound of formula V$b$; and
28.3% of Irganox® 1076 (compound of formula AO-2).
4. 42.5% of Irgafos®168 (tris(2,4-di-tert-butylphenyl) phosphite),
15.0% of a mixture of about 85 parts by weight of the compound of formula V$a$ and about 15 parts by weight of the compound of formula V$b$; and
42.5% of Irganox®3114 (compound of formula AO-7).

The incorporation of components (A) and (B) and optional further additives into the polyolefin is carried out by known methods, for example before or after molding or also by applying the dissolved or dispersed stabilizer mixture to the polyolefin, with or without subsequent evaporation of the solvent. The stabilizer mixture of components (A) and (B) and optional further additives can also be added to the polyolefins to be stabilized in the form of a masterbatch which contains these components in a concentration of, for example, 2.5 to 25% by weight.

Components (A) and (B) and optional further additives can also be added before or during the polymerization or before crosslinking.

Components (A) und (B) and optional further additives can be incorporated into the polyolefin to be stabilized in pure form or encapsulated in waxes, oils or polymers.

Components (A) and (B) and optional further additives can also be sprayed onto the polyolefin to be stabilized. They are able to dilute other additives (for example the conventional additives indicated above) or their melts so that they can be sprayed also together with these additives onto the polyolefin to be stabilized. Addition by spraying during the deactivation of the polymerization catalysts is particularly advantageous, it being possible to carry out spraying using, for example, the steam used for deactivation.

In the case of spherically polymerized polyolefins it may, for example, be advantageous to apply components (A) and (B), optionally together with other additives, by spraying.

During the rotomolding process, the temperature expediently reaches the range from 200° to 400° C., preferably from 280° to 400° C., for example from 310° to 400° C.

A preferred embodiment of this invention relates to the use of the stabilizer combination comprising components (A) and (B) for polyolefins processed by the rotomolding process.

The following Examples illustrate the invention in more detail. Parts and percentages are by weight.

EXAMPLE 1

Preparation of polyolefin hollow articles by the rotomolding process

100 Parts of low density polyethylene, copolymerized with hexene (PE-LLD), type Quantum® Petrothene® GA-635-661, having a melt flow index of 6.5 g/10 min and a density of 0.935 g/cm³, are mixed with 0.170 part of Chimassorb® 944 ᵃ⁾, 0.050 part of zinc stearate and the stabilizers cited in Tables 1 and 2 at 232° C. in a Superior/MPM Extruder, fitted with a 24:1 Maddock type L/D screw, at 100 revolutions per minute. The polymer is then ground. The particle size of the polymer is from 150 to 500 µm. Owing to the larger surface of the particles obtained by grinding, the heat can be absorbed faster, which goes hand in hand with a lower energy consumption.

The actual rotomolding process or rotational molding process, which permits the production of fairly large three-dimensional solids, is carried out in a Clamshell type rotomolder FSP M20. In this machine, an aluminium mold, which is mounted on an arm and into which the plastic sample is filled, is heated with a gas burner with circulation of the hot air over 5 minutes to 316° C., or over 6 minutes to 329° C., and is then kept at this temperature for a specific time (see Tables 1 and 2). Subsequently, the oven is opened and the mold is cooled first for 7 minutes with circulating air, then for 7 minutes by spraying with water and finally for another 2 minutes with circulating air. During the entire heating and cooling process, the mold, which is mounted on two axes at right angles to each other, is rotated, the speed of the main axis being kept at 6 revolutions per minute and the rotational ratio being 4.5:1. After cooling, the lid of the mold is opened and the resultant hollow article is taken out. The yellowness index (YI) of the exterior of the molded articles is determined according to ASTM D 1925-70. Low YI values denote little discoloration, high YI values strong discoloration of the samples. The less discoloration, the more effective the stabilizer. The results are summarized in Tables 1 and 2.

TABLE 1

Rotomolding at 316° C.

| | | Yellowness index after | |
|---|---|---|---|
| Examples | Stabilizer | 8 minutes | 10 minutes |
| Example 1aᵇ⁾ | 0.05% of Irganox ® 1010ᵈ⁾ 0.10% Irgafos ® 168ᵉ⁾ | 6.1 | 17.5 |
| Example 1bᶜ⁾ | 0.02% compound (101)ᶠ 0.08% Irgafos ® 168ᵉ⁾ | 4.1 | 5.0 |

TABLE 2

Rotomolding at 329° C.

| | | Yellowness Index after | |
|---|---|---|---|
| Examples | Stabilizer | 6 minutes | 8 minutes |
| Example 1cᵇ⁾ | 0.05% Irganox ® 1010ᵈ⁾ 0.10% Irgafos ® 168ᵉ⁾ | 4.0 | 17.0 |
| Example 1dᶜ⁾ | 0.02% compound (101)ᶠ 0.08% Irgafos ® 168ᵉ⁾ | 4.3 | 5.7 |

ᵃ⁾Chimassorb ® 944 (Ciba Spezialitätenchemie AG) denotes linear or cyclic condensates prepared from N,N'-bis(2,2,6,6-tetramethyl-4-piperidyl) hexamethylenediamine and 4-tert-octylamino-2,6-dichloro-1,3,5-triazine (compound of formula (H5))

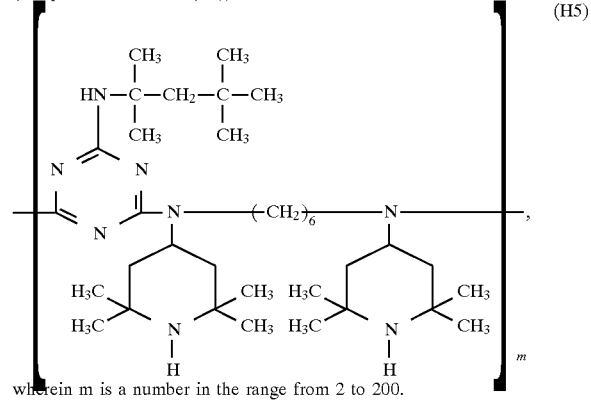

wherein m is a number in the range from 2 to 200.
ᵇ⁾Comparison Examples.
ᶜ⁾Examples of this invention.
ᵈ⁾Irganox ® 1010 (Ciba Spezialitätenchemie AG) denotes the pentaerythritol ester of 3-(3,5- di-tert-butyl-4-hydroxyphenyl)prionic acid (compound of formula AO-3)

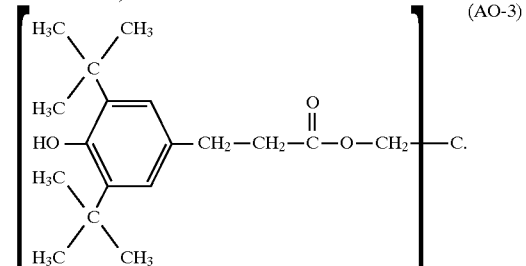

ᵉ⁾Irgafos ® 168 (Ciba Spezialitätenchemie AG) denotes tris(2,4-di-tert-butylphenyl)phosphite.
ᶠ⁾Compound (101) is a mixture of about 85 parts by weight of the compound of formula Va and about 15 parts by weight of formula Vb TABLE 2-continued Rotomolding at 329° C.

| Examples | Stabilizer | Yellowness Index after |  |
|---|---|---|---|
|  |  | 6 minutes | 8 minutes |

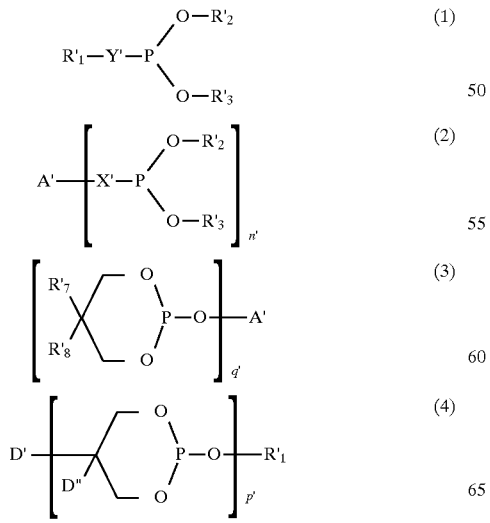

What is claimed is:

1. A process for the production of polyolefin hollow articles, which comprises charging the polyolefin with a stabilizer combination, comprising A) at least one compound from the group of the organic phosphites or phosphonites, and B) at least one compound from the group of the 3-arylbenzofuranones, filling this mixture into a mold, heating this mold in an oven to above 280° C., such that the stabilized polyolefin fuses, rotating the mold around at least 2 axes, the plastic material spreading to the walls, and cooling the mold while still rotating, opening it and taking the resultant hollow article out.

2. A process according to claim 1, comprising as component (A) a compound of the formula 1, 2, 3, 4, 5, 6 or 7

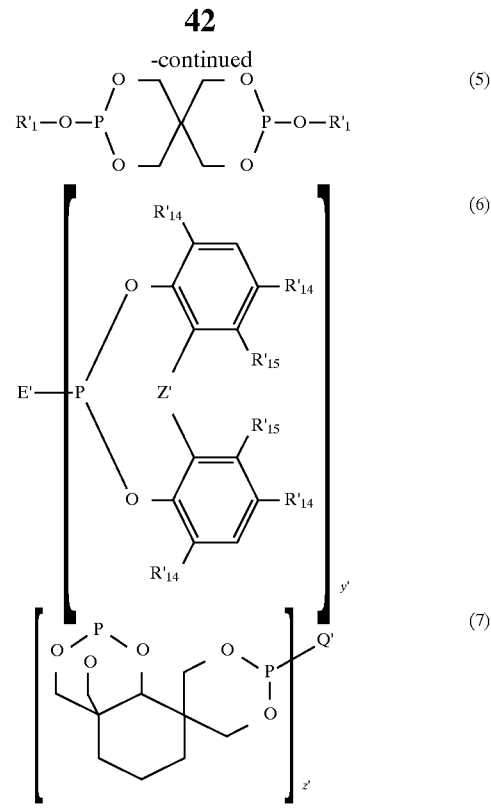

in which the indices are integral and $n'$ is 2, 3 or 4; $p'$ is 1 or 2; $q'$ is 2 or 3; $r'$ is 4 to 12; $y'$ is 1, 2 or 3; and $z'$ is 1 to 6;

A', if $n'$ is 2, is $C_2$–$C_{18}$alkylene; $C_2$–$C_{12}$alkylene interrupted by oxygen, sulfur or —NR'$_4$—; a radical of the formula

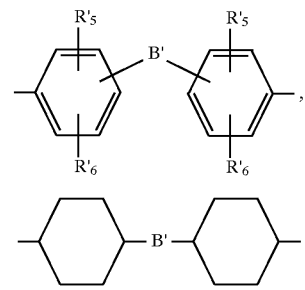

or phenylene;

A', if $n'$ is 3, is a radical of the formula —$C_rH_{2r'-1}$—;

A', if $n'$ is 4, is

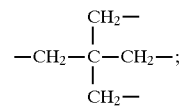

A" is as defined for A' if $n'$ is 2;

B' is a direct bond, —$CH_2$—, —$CHR'_4$—, —$CR'_1R'_4$—, sulfur, $C_5$–$C_7$cycloalkylidene, or cyclohexylidene which is substituted by from 1 to 4 $C_1$–$C_4$alkyl radicals in position 3, 4 and/or 5;

D', if $p'$ is 1, is $C_1$–$C_4$alkyl and, if $p'$ is 2, is —$CH_2OCH_2$—;

D", if $p'$ is 1, is $C_1$–$C_4$alkyl;

E', if $y'$ is 1, is $C_1$–$C_{18}$alkyl, —OR'$_1$ or halogen;

E', if y is 2, is —O—A"—O—,

E', if y is 3, is a radical of the formula R'$_4$C(CH$_2$O—)$_3$ or N(CH$_2$CH$_2$O—)$_3$;

Q' is the radical of an at least z'-valent alcohol or phenol, this radical being attached via the oxygen atom to the phosphorus atom;

R'$_1$, R'$_2$ and R'$_3$ independently of one another are C$_1$–C$_{18}$alkyl which is unsubstituted or substituted by halogen, —COOR'$_4$, —CN or —CONR'$_4$R'$_4$; C$_2$–C$_{18}$alkyl interrupted by oxygen, sulfur or —NR'$_4$—; C$_7$–C$_9$phenylalkyl; C$_5$–C$_{12}$cycloalkyl, phenyl or naphthyl; naphthyl or phenyl substituted by halogen, 1 to 3 alkyl radicals or alkoxy radicals having a total of 1 to 18 carbon atoms or by C$_7$–C$_9$phenylalkyl; or a radical of the formula

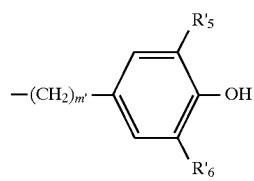

in which m' is an integer from the range 3 to 6;

R'$_4$ is hydrogen, C$_1$–C$_8$alkyl, C$_5$–C$_{12}$cycloalkyl or C$_7$–C$_9$phenylalkyl, R'$_5$ and R'$_6$ independently of one another are hydrogen, C$_1$–C$_8$alkyl or C$_5$–C$_6$cycloalkyl, R'$_7$ and R'$_8$, if q' is 2, independently of one another are C$_1$–C$_4$alkyl or together are a 2,3-dehydropentamethylene radical; and R'$_7$ and R'$_8$, if q' is 3, are methyl;

R'$_{14}$ is hydrogen, C$_1$–C$_9$alkyl or cyclohexyl,

R'$_{15}$ is hydrogen or methyl and, if two or more radicals R'$_{14}$ and R'$_1$, R'$_5$ are present, these radicals are identical or different, X' and Y' are each a direct bond or oxygen, Z' is a direct bond, methylene, —C(R'$_{16}$)$_2$— or sulfur, and R'$_{16}$ is C$_1$–C$_8$alkyl.

3. A process according to claim 1, comprising as component (A) tris(2,4-di-tert-butylphenyl) phosphite, tris(nonylphenyl) phosphite or a compound of the formula A, B, C, D, E, F, G, H, I, K or L

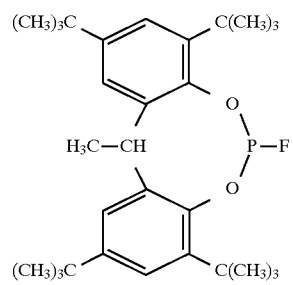

(A)

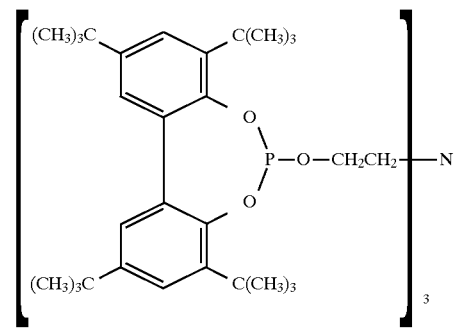

(B)

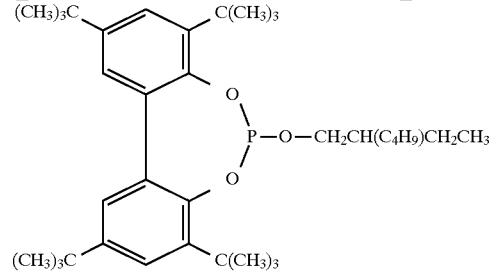

(C)

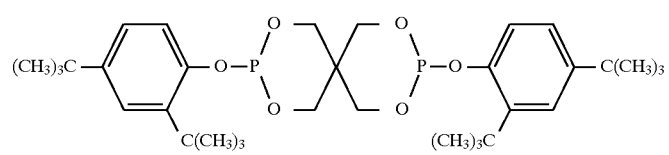

(D)

-continued
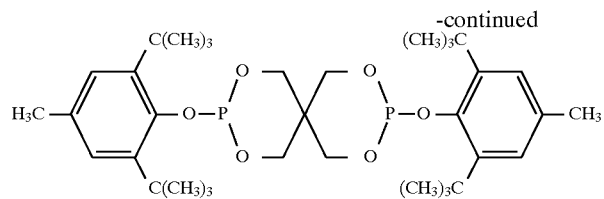 (E)
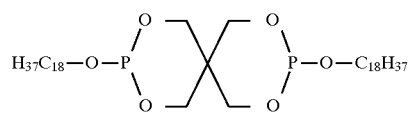 (F)
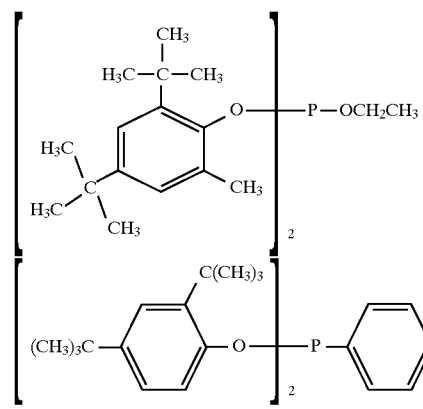 (G)
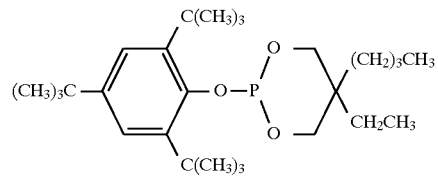 (H)
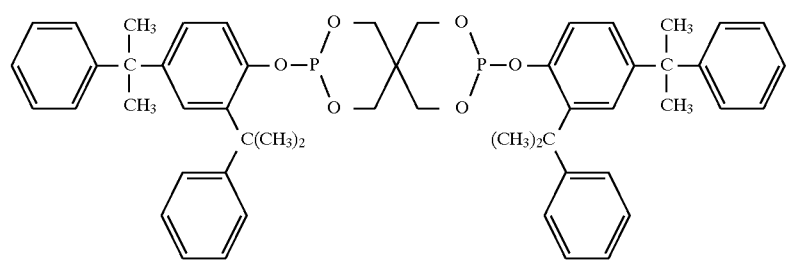 (I)
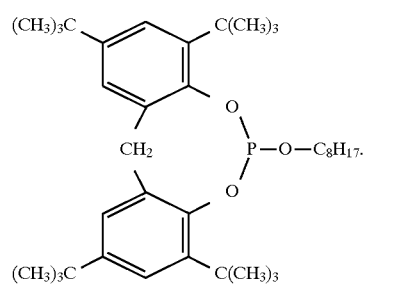 (K)
 (L)

4. A process according to claim 1, comprising as component (B) a compound of the formula I

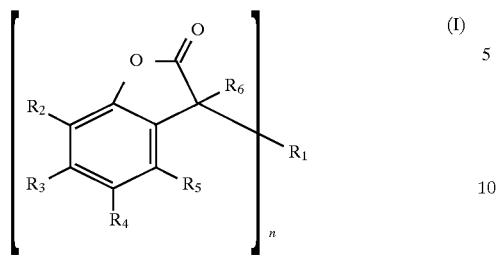

in which, if n is 1,

R, is unsubstituted or $C_1$–$C_4$alkyl-, $C_1$–$C_4$alkoxy-, $C_1$–$C_4$alkylthio-, hydroxyl-, halo-, amino-, $C_1$–$C_4$alkylamino-, phenylamino- or di($C_1$–$C_4$alkyl)amino-substituted naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, ,-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl, or $R_1$ is a radical of the formula II

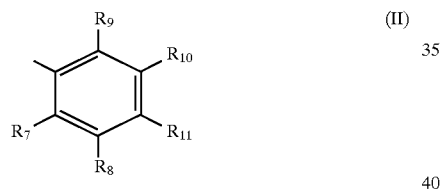

and if n is 2, $R_1$ is unsubstituted or $C_1$–$C_4$alkyl- or hydroxy-substituted phenylene or naphthylene; or is —$R_{12}$—X—$R_{13}$—, $R_2$, $R_3$, R4 and $R_5$ independently of one another are hydrogen, chlorine, hydroxyl, $C_1$–$C_{25}$alkyl, $C_7$–$C_9$phenylalkyl, unsubstituted or $C_1$–$C_4$alkyl-substituted phenyl; unsubstituted or $C_1$–$C_4$alkylsubstituted $C_5$–$C_8$cycloalkyl; $C_1$–$C_{18}$alkoxy, $C_1$–$C_{18}$alkylthio, $C_1$–$C_4$alkylamino, di($C_1$–$C_4$alkyl)amino, $C_1$–$C_{25}$alkanoyloxy, $C_1$–$C_{25}$alkanoylamino, $C_3$–$C_{25}$alkenoyloxy, $C_3$–$C_{25}$alkanoyloxy which is interrupted by oxygen, sulfur or

$C_6$–$C_9$cycloalkylcarbonyloxy, benzoyloxy or $C_1$–$C_{12}$alkyl-substituted benzoyloxy; or else the radicals $R_2$ and $R_3$ or the radicals $R_3$ and $R_4$ or the radicals $R_4$ and $R_5$, together with the carbon atoms to which they are attached, form a benzo ring, $R_4$ is additionally —$(CH_2)_p$—$COR_{15}$ or —$(CH_2)_q$OH or, if $R_3$, $R_5$ and $R_6$ are hydrogen, $R_4$ is additionally a radical of the formula III

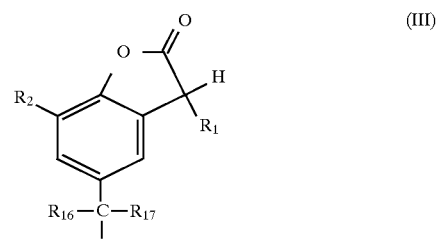

in which $R_1$ is defined as indicated above for n=1, $R_6$ is hydrogen or a radical of the formula IV

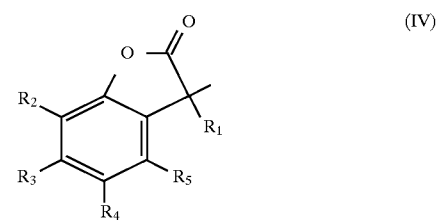

where $R_4$ is not a radical of the formula III and $R_1$ is defined as indicated above for n 1, $R_7$, $R_8$, $R_9$, $R_{10}$ and $R_{11}$ independently of one another are hydrogen, halogen, hydroxyl, $C_1$–$C_{25}$alkyl, $C_2$–$C_{25}$alkyl interrupted by oxygen, sulfur or

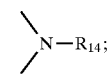

$C_1$–$C_{25}$alkoxy, $C_2$–$C_{25}$alkoxy interrupted by oxygen, sulfur or

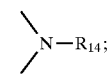

$C_1$–$C_{25}$alkylthio, $C_3$–$C_{25}$alkenyl, $C_3$–$C_{25}$alkenyloxy, $C_3$–$C_{25}$alkynyl, $C_3$–$C_{25}$alkynyloxy, $C_7$–$C_9$phenylalkyl, $C_7$–$C_9$phenylalkoxy, unsubstituted or $C_1$–$C_4$alkyl-substituted phenyl; unsubstituted or $C_1$–$C_4$alkyl-substituted phenoxy; unsubstituted or $C_1$–$C_4$alkyl-substituted $C_5$–$C_8$cycloalkyl; unsubstituted or $C_1$–$C_4$alkyl-substituted $C_5$–$C_8$cycloalkoxy; $C_1$–$C_4$alkylamino, di($C_1$–$C_4$alkyl)amino, $C_1$–$C_{25}$alkanoyl, $C_3$–$C_{25}$alkanoyl interrupted by oxygen, sulfur or

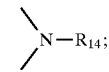

$C_1$–$C_{25}$alkanoyloxy, $C_3$–$C_{25}$alkanoyloxy interrupted by oxygen, sulfur or

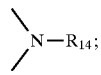

$C_1-C_{25}$alkanoylamino, $C_3-C_{25}$alkenoyl, $C_3-C_{25}$alkenoyl interrupted by oxygen, sulfur or

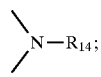

$C_3-C_{25}$alkenoyloxy, $C_3-C_{25}$alkenoyloxy interrupted by oxygen, sulfur or

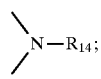

$C_6-C_9$cycloalkylcarbonyl, $C_6-C_9$cycloalkyl carbonyloxy, benzoyl or $C_1-C_{12}$substituted benzoyl; benzoyloxy or $C_1-C_{12}$alkyl-substituted benzoyloxy;

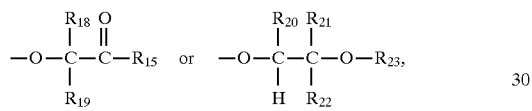

or else, in formula II, the radicals $R_7$ and $R_8$ or the radicals $R_8$ and $R_{11}$, together with the carbon atoms to which they are attached, form a benzo ring, $R_{12}$ and $R_{13}$ independently of one another are unsubstituted or $C_1-C_4$alkyl-substituted phenylene or naphthylene, $R_{14}$ is hydrogen or $C_1-C_8$alkyl, $R_{15}$ is hydroxyl,

$C_1-C_{18}$alkoxy or

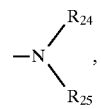

$R_{16}$ and $R_{17}$ independently of one another are hydrogen, $CF_3$, $C_1-C_{12}$alkyl or phenyl, or $R_{16}$ and $R_{17}$, together with the C atom to which they are attached, form a $C_5-C_8$cycloalkylidene ring which is unsubstituted or substituted from 1 to 3 times by $C_1-C_4$alkyl;

$R_{18}$ and $R_{19}$ independently of one another are hydrogen, $C_1-C_4$alkyl or phenyl, $R_{20}$ is hydrogen or $C_1-C_4$alkyl, $R_{21}$ is hydrogen, unsubstituted or $C_1-C_4$alkyl-substituted phenyl; $C_1-C_{25}$alkyl, $C_2-C_{25}$alkyl interrupted by oxygen, sulfur or

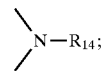

$C_7-C_9$phenylalkyl which is unsubstituted or substituted on the phenyl radical from 1 to 3 times by $C_1-C_4$alkyl; $C_7-C_{25}$phenylalkyl which is unsubstituted or substituted on the phenyl radical from 1 to 3 times by $C_1-C_4$alkyl and interrupted by oxygen, sulfur or

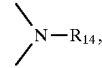

or else the radicals $R_{20}$ and $R_{21}$, together with the carbon atoms to which they are attached, form a $C_5-C_{12}$cycloalkylene ring which is unsubstituted or substituted from 1 to 3 times by $C_1-C_4$alkyl;

$R_{22}$ is hydrogen or $C_1-C_4$alkyl, $R_{23}$ is hydrogen, $C_1-C_{25}$alkanoyl, $C_3-C_{25}$alkenoyl, $C_3-C_{25}$alkanoyl interrupted by oxygen, sulfur or

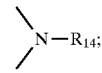

$C_2-C_{25}$alkanoyl substituted by a di($C_1-C_6$alkyl) phosphonate group; $C_6-C_9$cycloalkylcarbonyl, thenoyl, furoyl, benzoyl or $C_1-C_{12}$alkyl-substituted benzoyl;

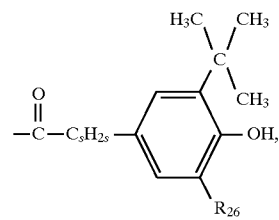

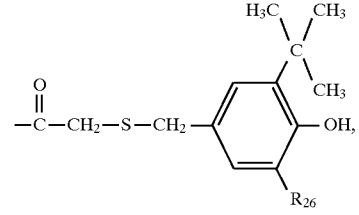

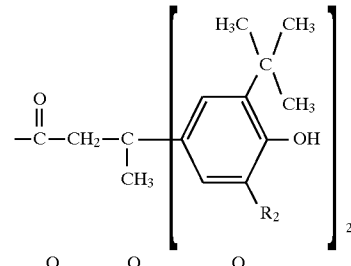

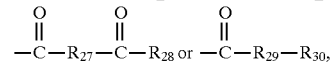

$R_{24}$ and $R_{25}$ independently of one another are hydrogen or $C_1-C_{18}$alkyl, $R_{26}$ is hydrogen or $C_1$–$C_8$alkyl, $R_{27}$ is a direct bond, $C_1$–$C_{18}$alkylene, $C_2$–$C_{18}$alkylene interrupted by oxygen, sulfur or

$C_2$–$C_{18}$alkenylene, $C_2$–$C_{20}$alkylidene, $C_7$–$C_{20}$phenylalkylidene, $C_5$–$C_8$cycloalkylene, $C_7$–$C_8$bicycloalkylene, unsubstituted or $C_1$–$C_4$alkyl-substituted phenylene,

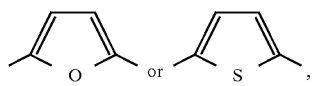

$R_{28}$ is hydroxyl,

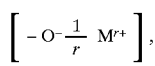

$C_1$–$C_{18}$alkoxy or

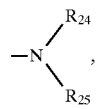

$R_{29}$ is oxygen, —NH— or

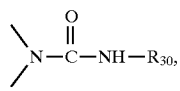

$R_{30}$ is $C_1$–$C_{18}$alkyl or phenyl,
$R_{31}$ is hydrogen or $C_1$–$C_{18}$alkyl,
M is an r-valent metal cation,
X is a direct bond, oxygen, sulfur or —$NR_{31}$—,
n is 1 or 2,
p is 0, 1 or 2,
q is 1, 2, 3, 4, 5 or 6,
r is 1, 2 or 3, and
s is 0, 1 or 2.

5. A process according to claim 1, comprising as component (B) a compound of the formula V

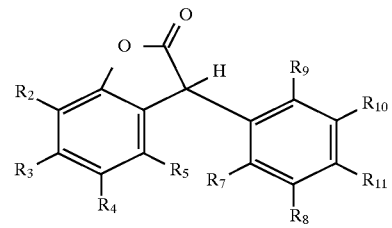

in which $R_2$ is hydrogen or $C_1$–$C_6$alkyl, $R_3$ is hydrogen, $R_4$ is hydrogen or $C_1$–$C_6$alkyl, $R_5$ is hydrogen, $R_7$, $R_8$, $R_9$, $R_{10}$ and $R_{11}$ independently of one another are hydrogen, $C_1$–$C_4$alkyl or $C_1$–$C_4$alkoxy, with the proviso that at least two of the radicals $R_7$, $R_8$, $R_9$, $R_{10}$ or $R_{11}$ are hydrogen.

6. A process according to claim 1, comprising as component (B) a compound of the formula Va or Vb

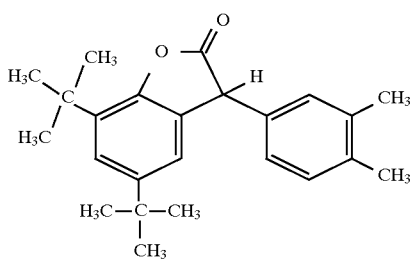

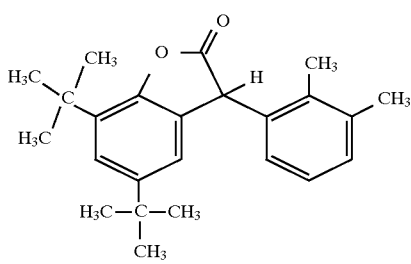

or a mixture of the two compounds of the formula V$a$ and V$b$.

7. A process according to claim 1, wherein the temperature reaches the range from about 200° to 400° C.

* * * * *

UNITED STATES PATENT AND TRADEMARK OFFICE
CERTIFICATE OF CORRECTION

PATENT NO. : 5,883,165
DATED : MARCH 16, 1999
INVENTOR(S) : CHRISTOPH KRÖHNKE ET AL..

It is certified that error appears in the above-identified patent and that said Letters Patent is hereby corrected as shown below:

On the title page, section [75] should read:

-- [75]   Inventors:   Christoph Kröhnke, Breisach, Germany;

Urs Leo Stadler, Madison, N.J. --.

Signed and Sealed this

Twentieth Day of July, 1999

Attest:

Q. TODD DICKINSON

*Attesting Officer*      *Acting Commissioner of Patents and Trademarks*